United States Patent
Rahman et al.

(10) Patent No.: US 9,912,362 B2
(45) Date of Patent: Mar. 6, 2018

(54) APPARATUS AND METHOD FOR MITIGATING INTERFERENCE IN A WIRELESS COMMUNICATION SYSTEM

(71) Applicant: Samsung Electronics Co., Ltd., Suwon-si, Gyeonggi-do (KR)

(72) Inventors: Md. Saifur Rahman, Richardson, TX (US); Young-Han Nam, Plano, TX (US); Yan Xin, Princeton, NJ (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 393 days.

(21) Appl. No.: 14/594,926

(22) Filed: Jan. 12, 2015

(65) Prior Publication Data

US 2016/0073415 A1 Mar. 10, 2016

Related U.S. Application Data

(60) Provisional application No. 62/048,717, filed on Sep. 10, 2014.

(51) Int. Cl.
| | |
|---|---|
| *H04B 1/12* | (2006.01) |
| *H04L 25/02* | (2006.01) |
| *H04B 1/7107* | (2011.01) |
| *H04B 17/345* | (2015.01) |
| *H04J 11/00* | (2006.01) |

(52) U.S. Cl.
CPC ............ *H04B 1/12* (2013.01); *H04B 1/7107* (2013.01); *H04B 17/345* (2015.01); *H04J 11/004* (2013.01); *H04J 11/0059* (2013.01); *H04L 25/0228* (2013.01)

(58) Field of Classification Search
CPC ...... H04B 1/12; H04B 1/7107; H04B 17/345; H04L 25/0228
See application file for complete search history.

(56) References Cited

U.S. PATENT DOCUMENTS

| | | |
|---|---|---|
| 2006/0067446 A1 | 3/2006 | Maeda et al. |
| 2011/0222525 A1 | 9/2011 | Kishigami et al. |

(Continued)

OTHER PUBLICATIONS

International Search Report and Written Opinion issued for PCT/KR2015/009460 dated Dec. 16, 2015, 9 pgs.

(Continued)

*Primary Examiner* — Michael Thier
*Assistant Examiner* — Kent Krueger

(57) ABSTRACT

A method for mitigating interference in a wireless communication system includes receiving a signal transmitted from a mobile station, subtracting a target signal within a target bandwidth (BW) from the received signal to obtain a resultant signal, wherein the target signal is constructed by estimating a target channel and target symbols from the signal, determining a subspace blind interference sensing (BIS) BW by extending resource blocks (RBs) prior to a starting RB and after an ending RB of the target bandwidth using energy detection in each RB, determining a set of candidate interfering BWs in the subspace BIS BW by determining the number of interferers in each RB in the subspace BIS BW, and determining a set of candidate interfering DMRS sequences based on the set of candidate interfering BWs by performing DMRS detection for each candidate interfering BW.

20 Claims, 23 Drawing Sheets

(56) References Cited

U.S. PATENT DOCUMENTS

2013/0016767 A1    1/2013   Pean et al.
2013/0094427 A1    4/2013   Bhattad et al.
2014/0307703 A1*  10/2014   Gaal ................... H04L 5/0073
                                                                370/330

OTHER PUBLICATIONS

Toshiba, "Eigen-Feedback Reduction by Sub-Space Signalling", 3GPP TSG RAN WG1 Meeting #59bis, R1-100063, Jan. 12, 2010, 5 pgs.

* cited by examiner

- Issue 1: Map to the valid case with the closest $\delta_k$
- Issue 2: Output two hypotheses to the next iteration, continue 1st BW and continue 2nd BW
- Issue 3: Output two hypotheses to the next iteration, $(r_k, r_{k+1}, \delta_k)$ and $(r_k, r_{k+1}, \delta_k - 1)$ Case 2: $r_k = 2$

- $(r_k, r_{k+1}, \delta_k) = (2,0,2)$
- Case 2-0

- $(r_k, r_{k+1}, \delta_k) = (2,1,2)$
- Case 2-1

- $(r_k, r_{k+1}, \delta_k) = (2,1,3)$
- Case 2-2

- $(r_k, r_{k+1}, \delta_k) = (2,2,2)$
- Case 2-3

- $(r_k, r_{k+1}, \delta_k) = (2,2,3)$
- Case 2-4

- $(r_k, r_{k+1}, \delta_k) = (2,2,4)$
- Case 2-5

- $(r_k, r_{k+1}, \delta_k) = (2,3,3)$
- Case 2-6

- $(r_k, r_{k+1}, \delta_k) = (2,3,4)$
- Case 2-7

- $(r_k, r_{k+1}, \delta_k) = (2,3,4)$
- Case 2-8

APPARATUS AND METHOD FOR MITIGATING INTERFERENCE IN A WIRELESS COMMUNICATION SYSTEM

CROSS-REFERENCE TO RELATED APPLICATION AND CLAIM OF PRIORITY

The present application claims priority to U.S. Provisional Patent Application Ser. No. 62/048,717, filed Sep. 10, 2014, entitled "METHOD AND APPARATUS OF UPLINK BLIND INTERFERENCE SENSING FOR ADVANCED WIRELESS COMMUNICATION SYSTEMS". The content of the above-identified patent document is incorporated herein by reference.

TECHNICAL FIELD

The present application relates generally to wireless communications and, more specifically, to a system and method for mitigating interference.

BACKGROUND

In 3GPP Long Term Evolution (LTE) (3GPP LTE), a base station (BS) receives uplink (UL) data signals from a subscriber station within the coverage of the BS as well as other subscriber stations belonging to other BSs. In order to decode uplink data signal, the BS needs to distinguish between a desired signal and interfering signals.

SUMMARY

In a first embodiment, a method for mitigating interference in a wireless communication system is provided. The method includes receiving a signal transmitted from a mobile station. The method also includes subtracting a target signal within a target bandwidth (BW) from the received signal to obtain a resultant signal. The target signal is constructed by estimating the target channel and target symbols from the received signal. The method also includes determining a subspace blind interference sensing (BIS) BW by extending resource blocks (RBs) prior to the starting RB and after the ending RB of the target bandwidth using energy detection in each RB, determining a set of candidate interfering BWs in the subspace BIS BW by determining the number of interferers in each RB in the subspace BIS BW, determining a set of candidate interfering DeModulation Reference Signal (DMRS) sequences based on the set of candidate interfering BWs by performing DMRS detection for each candidate interfering BW, constructing interfering signals within the subspace BIS BW based on the set of candidate interfering DMRS sequences, subtracting the constructed interfering signals from the received signal, and decoding the target data signal from the resultant signal.

In a second embodiment, an apparatus for mitigating interference in a wireless communication system is provided. The apparatus includes a transceiver configured to receive a signal transmitted from a transmitter. The apparatus also includes a processor configured to subtract a target signal within a target bandwidth (BW) from the received signal to obtain a resultant signal. The target signal is constructed by estimating the target channel and target symbols from the signal. The processor is further configured to determine a subspace blind of interference sensing (BIS) BW by extending resource blocks (RBs) prior to the starting RB and after the ending RB of the target bandwidth, using an energy detection in each RB, determining a set of candidate interfering BWs in the subspace BIS BW by determining the number of interferers in each RB in the subspace BIS BW, determining a set of candidate interfering DeModulation Reference Signal (DMRS) sequences based on the set of candidate interfering BWs by performing DMRS detection for each candidate interfering BW, constructing interfering signals within the subspace BIS BW based on the set of candidate interfering DMRS sequences, subtracting the constructed interfering signals from the received signal, and decoding the target data signal from the resultant signal.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 22D, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Figure 1:
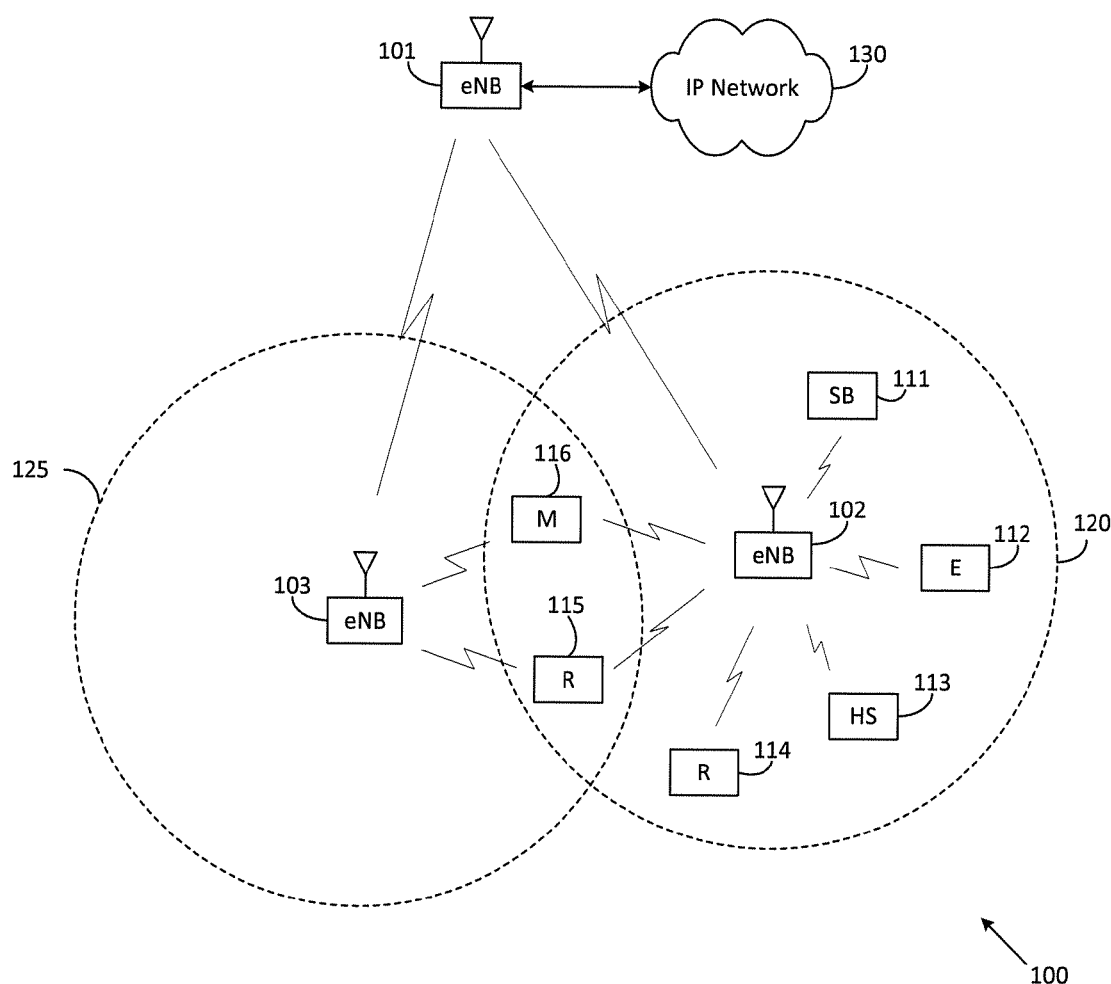
FIG. 1 illustrates an example wireless network according to embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of BS 101, BS 102 and BS 103 performs the blind interference sensing (BIS) process, such as performed by a BIS algorithm, and decodes the received signal after subtracting out at least one interfering signal determined by the BIS algorithm. In some embodiments, the BIS algorithm can be used in other devices, such as a subscriber station.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
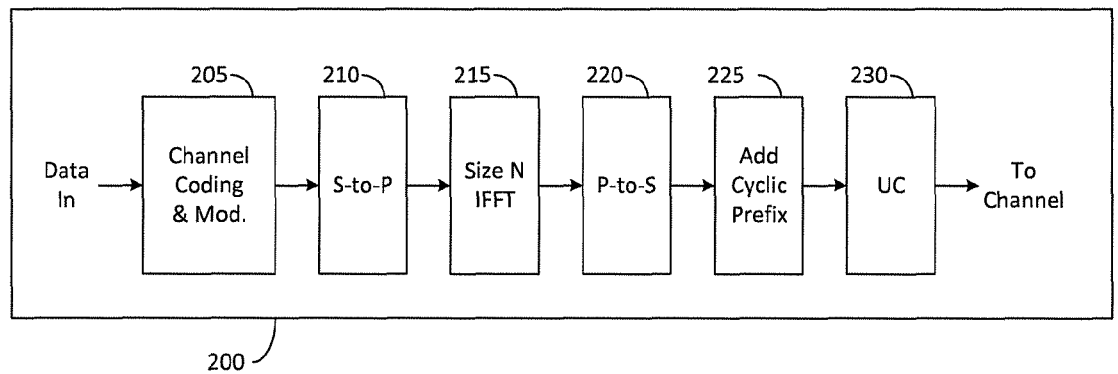
FIGS. 2A and 2B illustrate example wireless transmit and receive paths according to embodiments of the present disclosure.
Figure 2B:
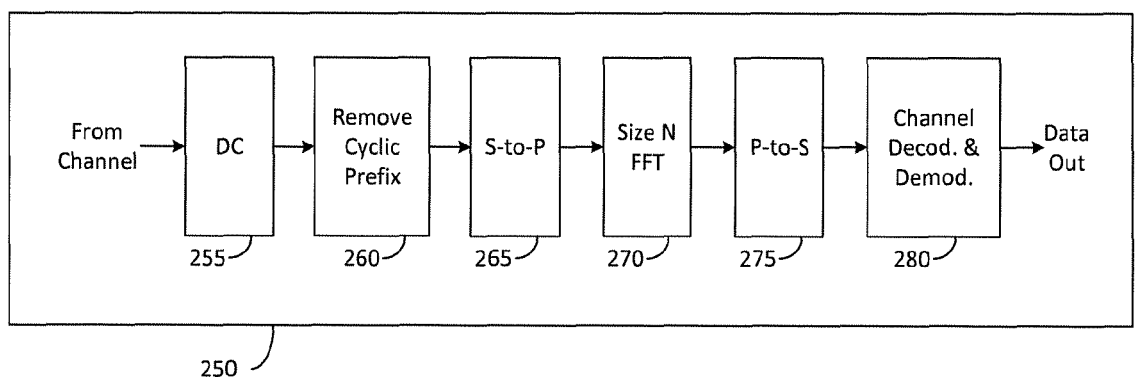

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the receive path 250 is configured to decode a received signal after subtracting out at least one interference signal determined by the BIS algorithm.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
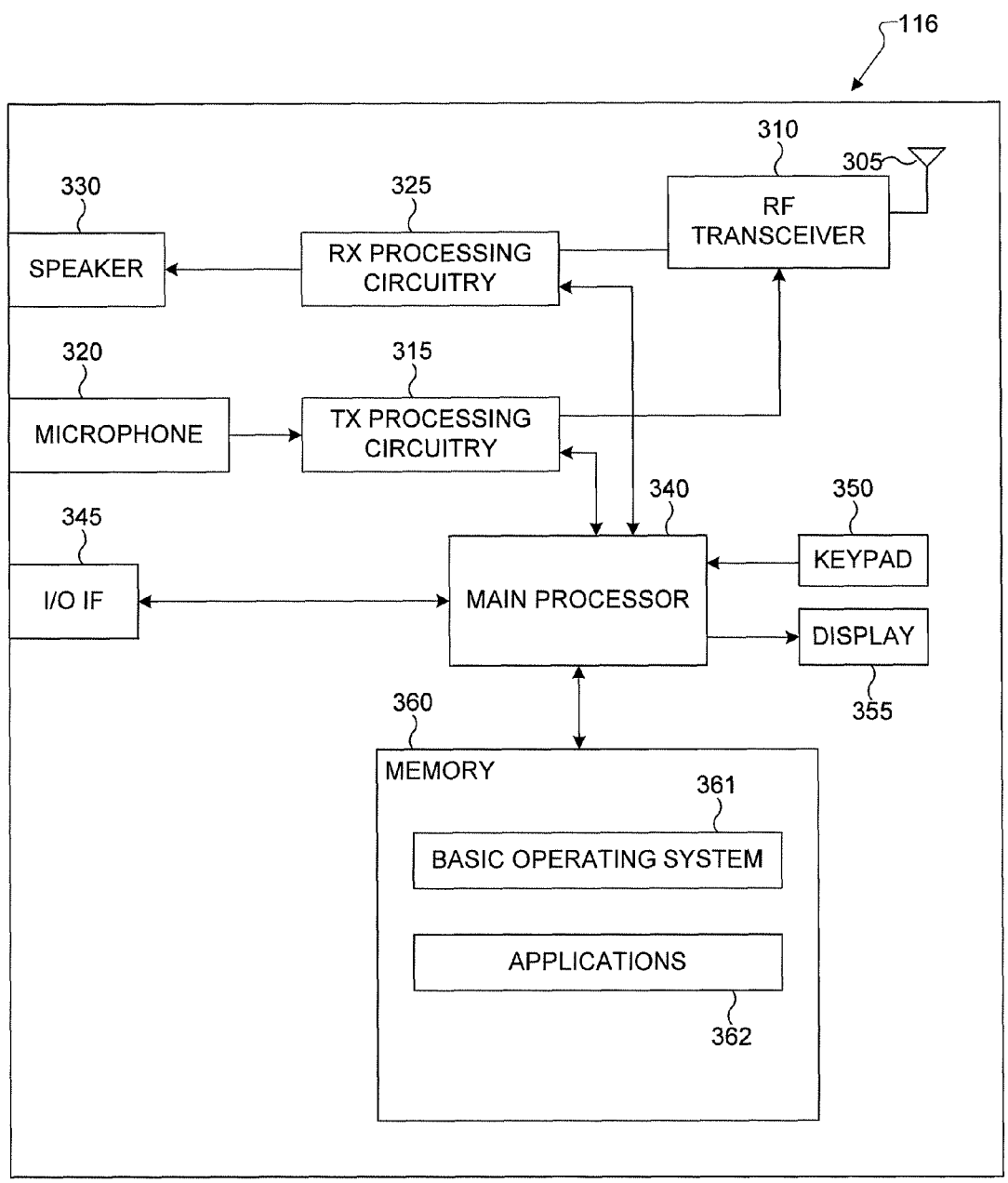
FIG. 3A illustrates an example user equipment according to this disclosure.

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

As shown in FIG. 3A, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for detecting interference signals and decoding a received signal subtracted by the interference signals. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
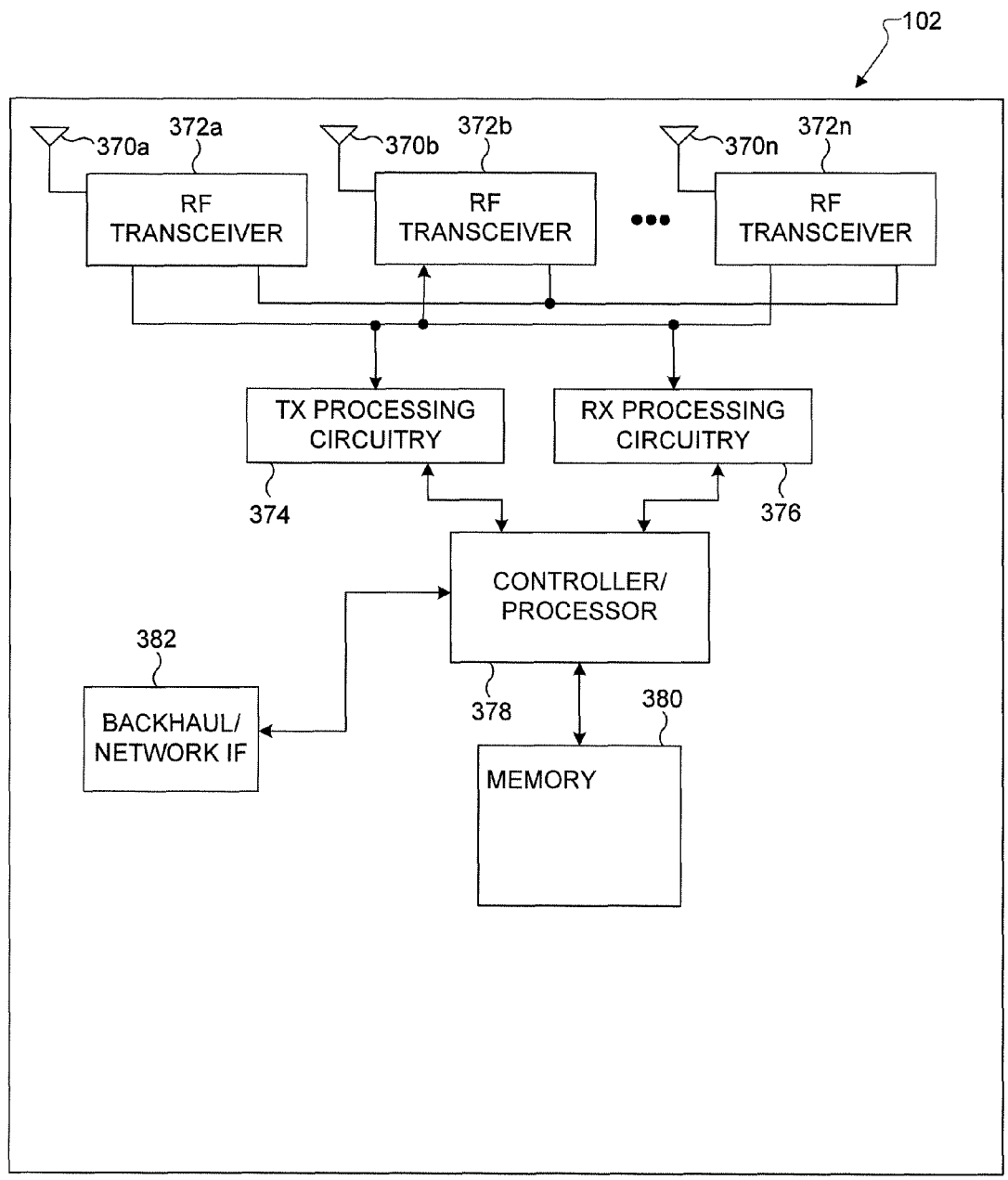
FIG. 3B illustrates an example eNB 102 according to this disclosure.

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 324 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 can move data into or out of the memory 380 as required by an executing process.

The controller/processor 378 is also coupled to the backhaul or network interface 335. The backhaul or network interface 382 allows the eNB 102 to communicate with other devices or systems over a backhaul connection or over a network. The interface 382 could support communications over any suitable wired or wireless connection(s). For example, when the eNB 102 is implemented as part of a cellular communication system (such as one supporting 5G, LTE, or LTE-A), the interface 382 could allow the eNB 102 to communicate with other eNBs over a wired or wireless backhaul connection. When the eNB 102 is implemented as an access point, the interface 382 could allow the eNB 102 to communicate over a wired or wireless local area network or over a wired or wireless connection to a larger network (such as the Internet). The interface 382 includes any suitable structure supporting communications over a wired or wireless connection, such as an Ethernet or RF transceiver.

The memory 380 is coupled to the controller/processor 325. Part of the memory 330 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the eNB 102 (implemented using the RF transceivers 372a-372n, TX processing circuitry 374, and/or RX processing circuitry 376) support communication with aggregation of FDD cells and TDD cells.

Although FIG. 3B illustrates one example of an eNB 102, various changes may be made to FIG. 3B. For example, the eNB 102 could include any number of each component shown in FIG. 3. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

Figure 4:
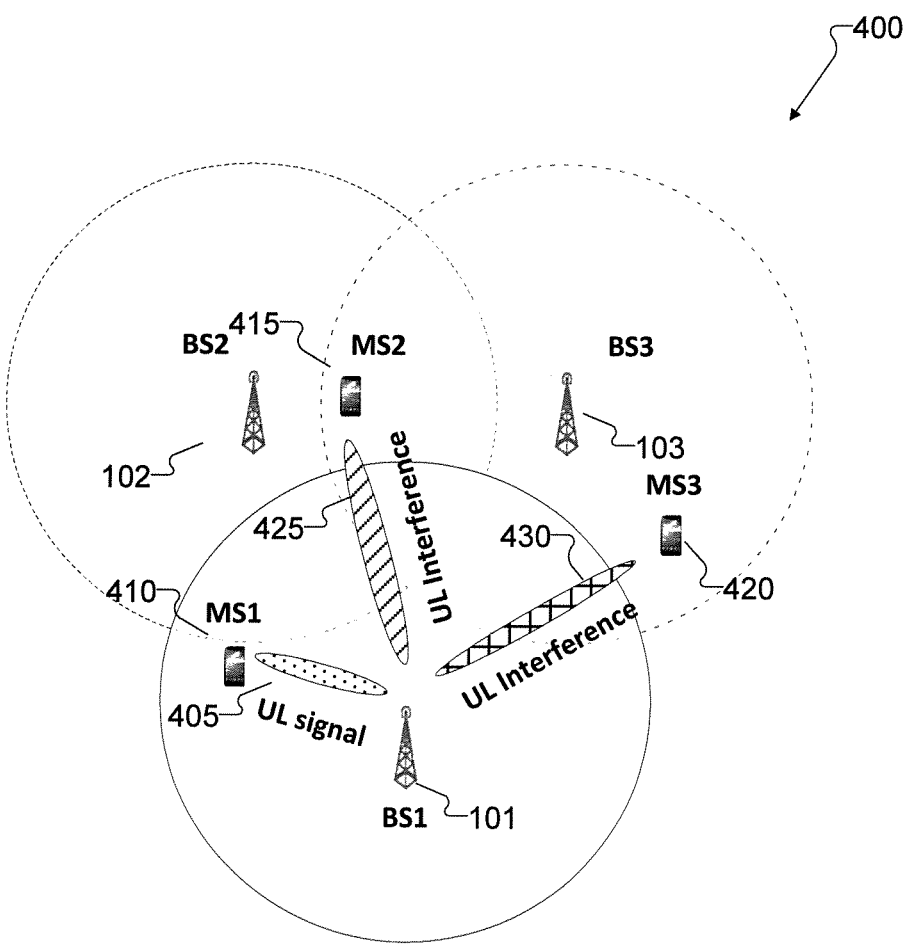
FIG. 4 illustrates cellular uplink transmissions in a wireless network 400 according to embodiments of the present disclosure.

FIG. 4 illustrates cellular uplink transmissions in a wireless network 400 according to embodiments of the present disclosure. The embodiment shown in FIG. 4 is for illustration only. Other embodiments could be used without departing from the scope of the present disclosure.

The UL received signal at eNB 101 includes a desired signal 405 from MS1 410, and two interfering signals from MS2 415 and MS3 420 that transmit signals intended to two neighboring cells eNB 102 and eNB 103. For example, eNB 101 receives an interfering signal 425 from MS2 415 and an interfering signal 430 from MS3 420. It is noted that MS1 101 can include the same or similar structure as UE 116 as illustrated in FIG. 3A. Additionally, one or more of MS2 415 and MS 3 420 can include the same or similar structure as UE 116.

If the received interference power is high, then decoding of the desired signal may fail. When the decoding fails, eNB 101 estimates at least one dominant interferer and subtracts (namely, cancels) the dominant interferer from the received signal prior to another decoding attempt. The eNB 101 can repeat this process multiple times if necessary. The challenge that eNB 101 has is the completely blind nature of interference sensing (BIS) and cancellation (IC). The eNB 101 needs to estimate all parameters necessary for IC, which includes number of dominant interferers (DI), and their PRB allocations, DMRS sequences, channels, modulation orders, and so forth. The information available at eNB 101 to estimate all these is received signal and parameters such as desired BW related to the desired signal 405 from MS1 410.

Figure 5:
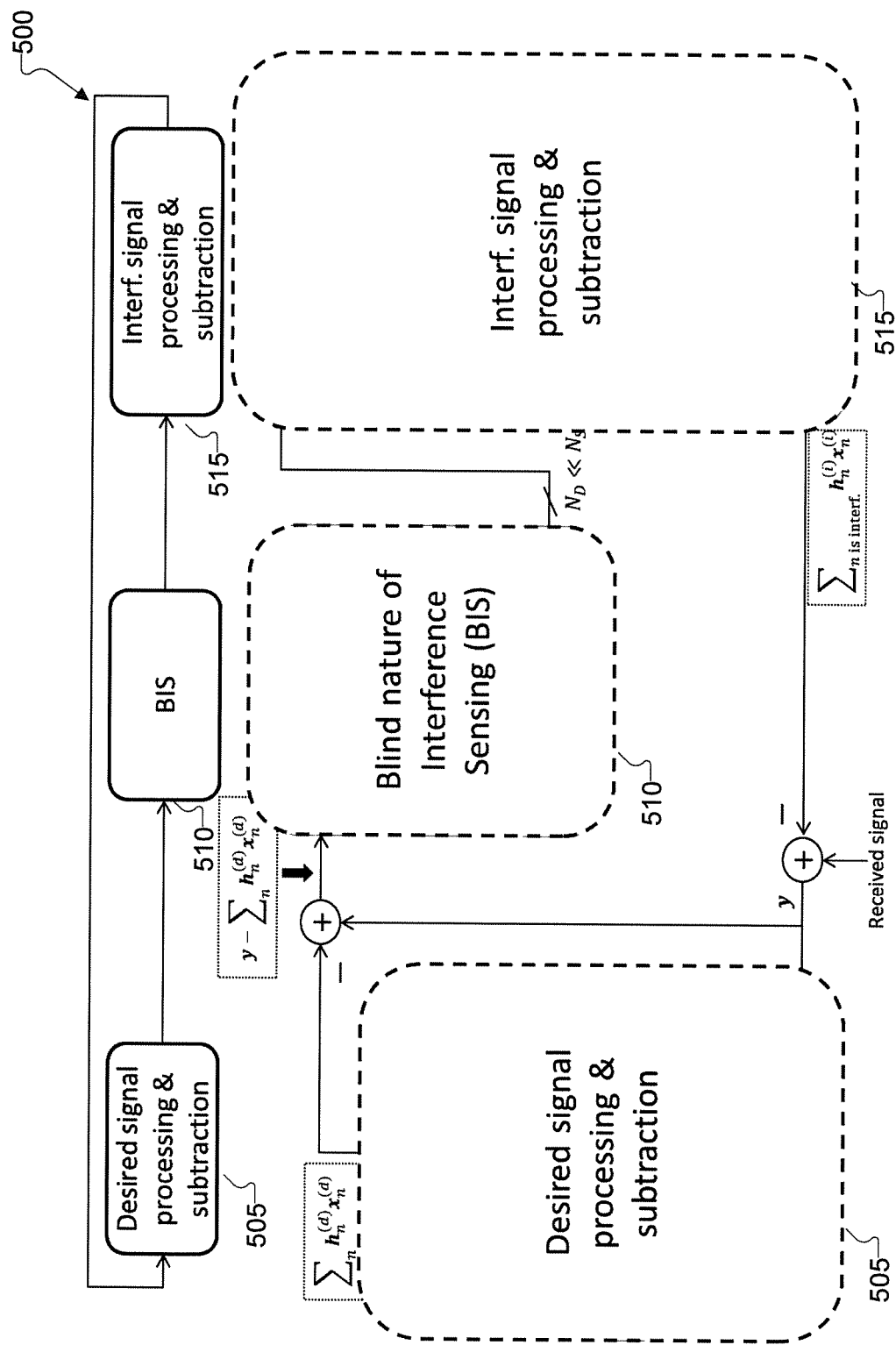
FIG. 5 illustrates a diagram of the overall Blind Interference Sensing (BIS) and Cancellation (IC) algorithm according to embodiments of the present disclosure.

FIG. 5 illustrates a diagram 500 of the overall Blind Interference Sensing (BIS) and Cancellation (IC) algorithm according to embodiments of the present disclosure. The embodiment shown in FIG. 5 is for illustration only. Other embodiments could be used without departing from the scope of the present disclosure. As illustrated in the example shown in FIG. 5, each iteration of the overall BIS and IC algorithm comprises the following three blocks. These three operation blocks are repeated until the desired signal decoding is successfully achieved or some other stopping criterion such as the maximum number of decoding attempts is met.

In a first block, the desired signal processing and subtraction 505 is performed. The initial input to the desired signal processing and subtraction 505 is the desired user's information, such as a desired BW (desired PRB allocation) and a received signal (y). The main processing for the desired signal processing and subtraction 505 includes desired channel estimation and decoding the received signal within the desired BW. If the decoding succeeds, then the algorithm stops; otherwise the desired signal ($\Sigma_n h_n^{(d)} x_n^{(d)}$) is subtracted by the received signal and the resultant signal ($y - \Sigma_n h_n^{(d)} x_n^{(d)}$) is fed to the next operation, namely the BIS 510.

A second block is the BIS 510. Using the desired BW and the received signal after desired signal subtraction, the BIS 510 estimates interference related parameters such as interfering BWs and DMRS sequences for different interferers.

A third block includes interference signal processing and subtraction 515. The estimated interfering DMRS sequences are then used to estimate interfering channels and modulations. They in turn are used to reconstruct the interference signal ($\Sigma_{n\ is\ interf.} h_n^{(i)} x_n^{(i)}$) for subtraction from the received signal (y). The resultant signal is then fed back to the desired signal processing and subtraction operation again for another decoding attempt.

Figure 6:
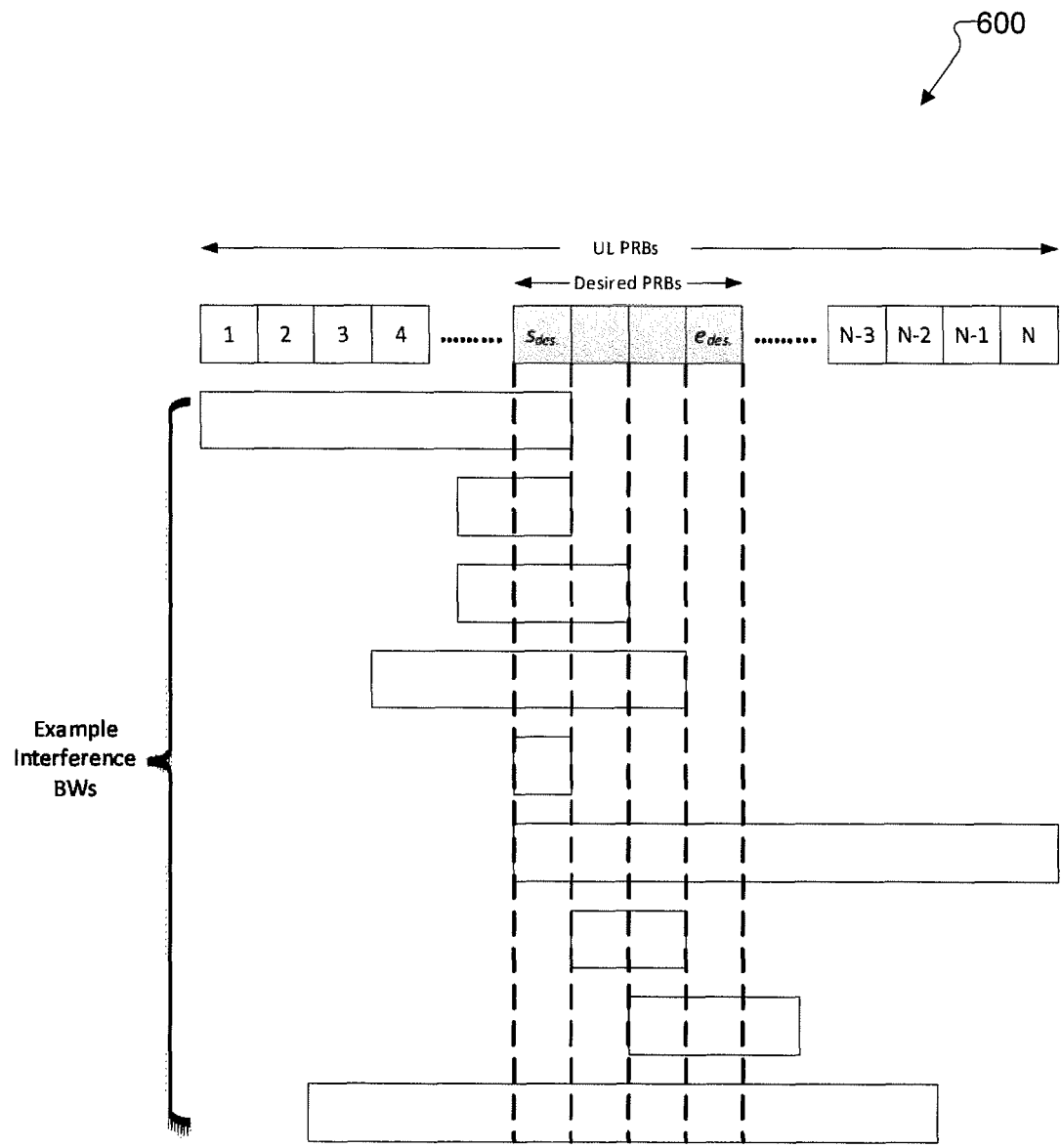
FIG. 6 illustrates several candidate interference BWs constructed according to embodiments of the present disclosure.

FIG. 6 illustrates several candidate interference BWs constructed according to some embodiments of the present disclosure. The example of the candidate interference BWs 600 shown in FIG. 6 is for illustration only. Other examples could be used without departing from the scope of the present disclosure.

The BIS starts by estimating interfering BWs of dominant interferers in terms of PRB indices. For this, a set of all possible interfering BWs I are considered that overlap with at least one PRB of the desired signal's BW: I={(s, e): s≤$e_{des}$, e≥$s_{des.}$, e≥s, s and e is a UL PRB index in the system BW}, where $s_{des.}$ and $e_{des.}$, respectively are the start and the end PRB indices of the desired BW.

Since the size of set I can be large for practical systems, fully exhaustive search over all interfering BW candidates in I has high complexity. Therefore, there is a need to reduce the search space while maintaining the performance close to the full search. This disclosure proposes a subspace-based BIS algorithm to reduce the interfering BW search space. The reduced search space includes the correct interfering BWs of the dominant interferers with high probability (close to 1) and the achieved complexity reduction is substantial compared to the full search.

Figure 7:
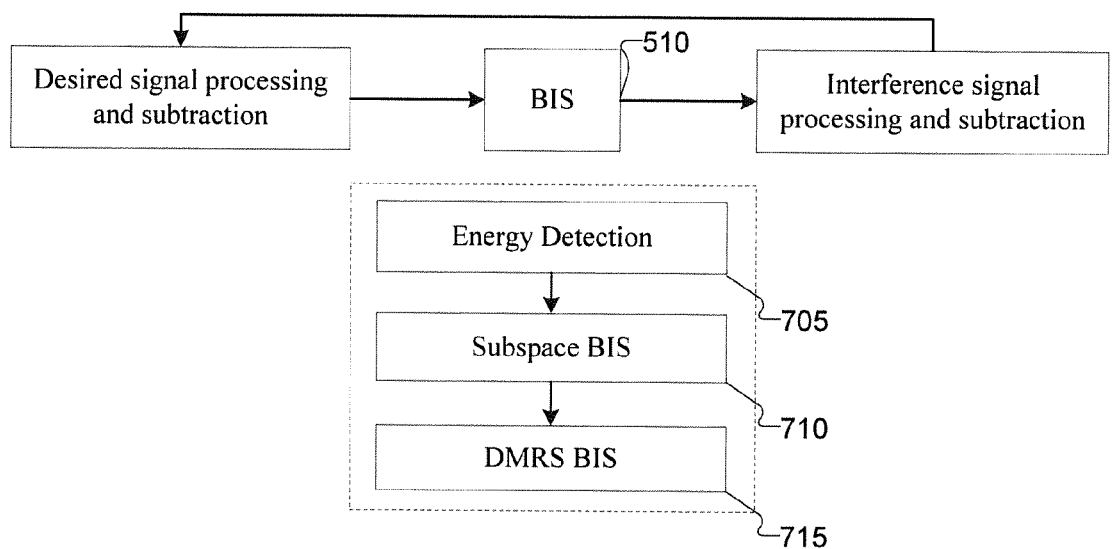
FIG. 7 illustrates the subspace BIS algorithm 700 according to embodiments of the present disclosure.

FIG. 7 illustrates the subspace BIS algorithm according to some embodiments of the present disclosure. The embodiment of the BIS algorithm 510 shown in FIG. 7 is for illustration only. Other embodiments could be used without departing from the scope of the present disclosure.

In some embodiments of this disclosure, the BIS algorithm is carried out in the three operations, as illustrated. The energy detection operation 705 detects the presence of interference in the whole UL PRBs (or total number of UL PRBs in the system BW), referred to as subspace BIS BW, by comparing the eigenvalues of the covariance matrices of the received signal after desired signal subtraction with a threshold value in different UL PRBs. The subspace BIS operation 710 performs the interference case detection (details are provided later) on all possible pairs of consecutive PRBs in the estimated subspace BIS BW, and obtains a set of candidate interference BWs (PRB allocations). Then, the DMRS BIS operation 715 performs interfering DMRS sequence detection for only those interference BWs that are in the set obtained in the subspace BIS operation.

Figure 8:
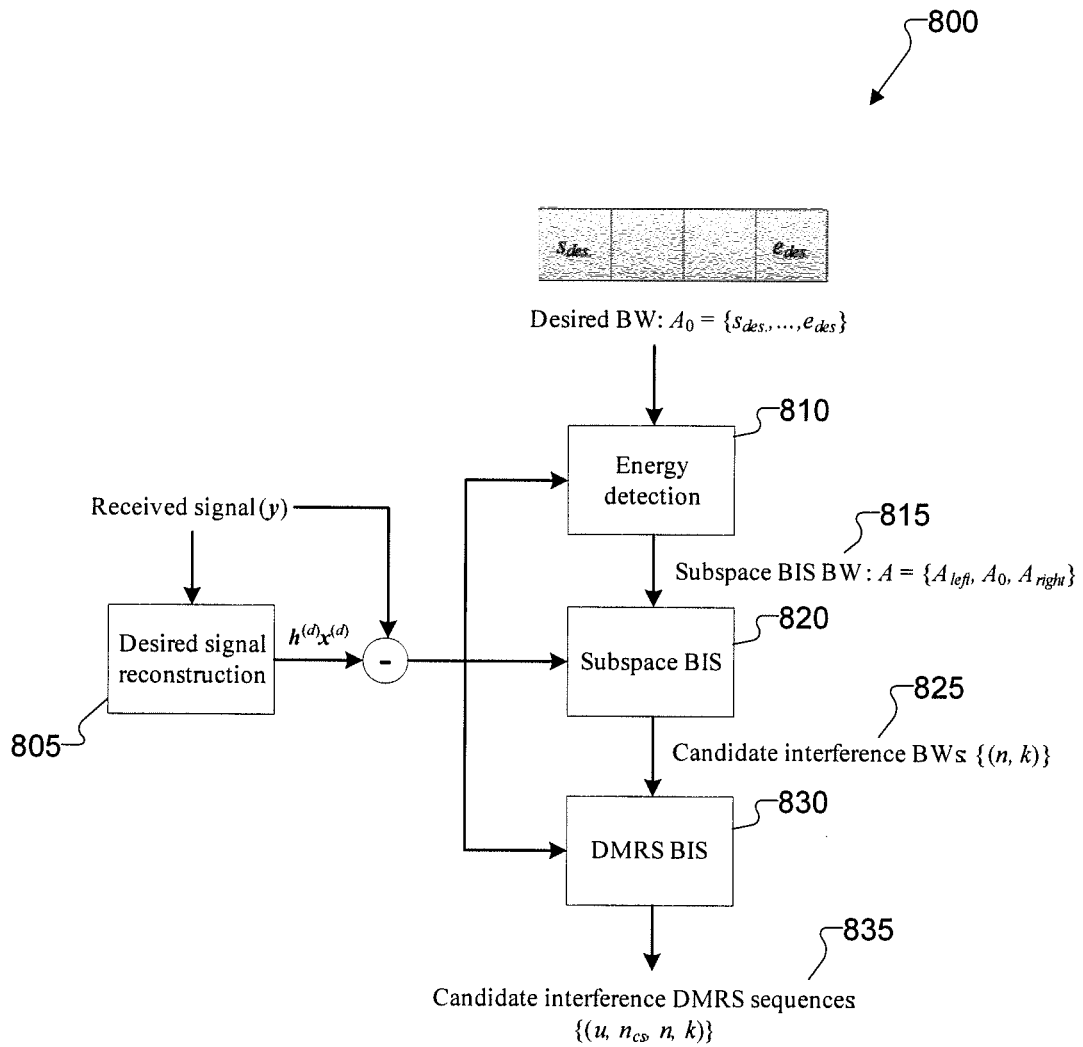
FIG. 8 illustrates a diagram 800 of the BIS algorithm according to embodiments of the present disclosure.

FIG. 8 illustrates a diagram 800 of the BIS algorithm according to some embodiments of the present disclosure. The embodiment shown in FIG. 8 is for illustration only. Other embodiments could be used without departing from the scope of the present disclosure.

In certain embodiments, the BIS algorithm 510 starts with the desired signal reconstruction 805: for example, from the estimated desired channel ($h^{(d)}$) and estimated desired symbols ($x^{(d)}$) as $h^{(d)} x^{(d)}$. The desired channel can be estimated from DMRS measurements and the desired symbols may be estimated from soft bits (LLRs) to modulation symbol mapping. The reconstructed desired signal is subtracted from the received signal (y).

The resultant signal $y-h^{(d)}x^{(d)}$ and the desired BW $A_0=\{s_{des}, \ldots, e_{des}\}$ are used to perform energy detection 810 to detect the presence of interference outside the desired BW $A_0$, but within the whole UL BW. The result of the energy detection 810 is subspace BIS BW 815, which is a set $A=\{A_{left}, A_0, A_{right}\}$ consisting of indices of UL PRBs in desired BW ($A_0$) and to the left ($A_{left}$) and to the right ($A_{right}$) of desired BW.

Consequently, the subspace BIS operation 820 performs an interference case detection for each pair of consecutive RBs in A and outputs a set of candidate interference BWs $\{(n, k)\}$ 825, where n and k correspond to the size and offset of interference BWs, respectively.

The DMRS BIS operation 830 carries out the DMRS sequence detection only for the candidate interference BWs. The outcome of the DMRS BIS operation is a set of DMRS parameters $\{(u, n_{cs}, n, k)\}$ 835, where u and $n_{cs}$, respectively are the remaining two parameters (group id and cyclic shift) of the candidate interference DMRS sequences.

Figure 9A:
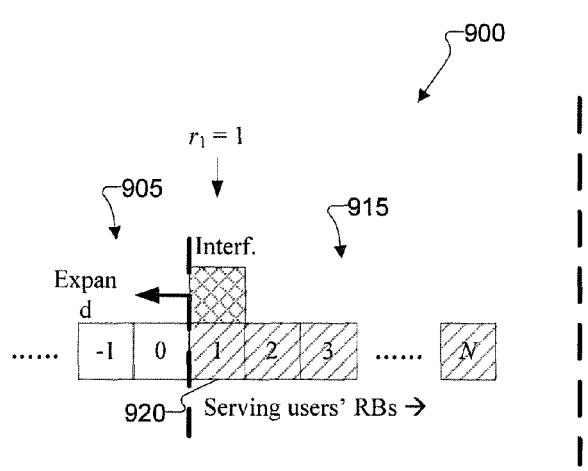
FIGS. 9A and 9B illustrate example energy detection operations 900, 910 to estimate subspace BIS BW according to embodiments of the present disclosure.
Figure 9B:
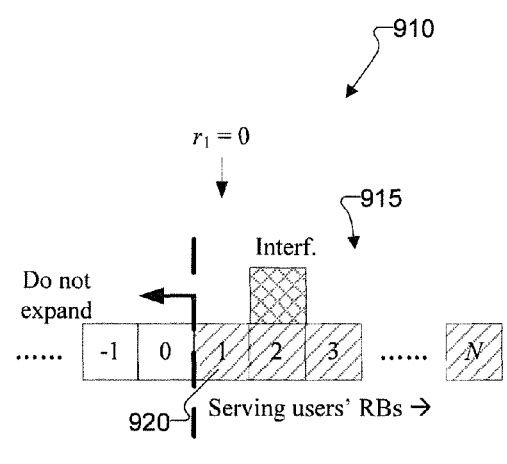

FIGS. 9A and 9B illustrate example energy detection operations 900, 910 to estimate subspace BIS BW according to embodiments of the present disclosure. The embodiments shown in FIGS. 9A and 9B are for illustration only. Other embodiments could be used without departing from the scope of the present disclosure.

In certain embodiments, starting with the desired BW, the subspace BIS BW iteratively expands 905 by one or more PRBs to the left of the desired BW in order to determine the subspace BIS BW. The expansion 905 is based on the energy detection using the eigenvalues of the covariance matrix of the received signal minus the reconstructed desired signal in one or more consecutive PRBs starting from the leftmost PRB in the desired BW. For example, if at least one of the eigenvalues is greater than a fixed threshold, then the presence of interference in the considered consecutive PRBs is declared.

As illustrated in the examples shown in FIG. 9A and FIG. 9B, PRBs 1, 2, . . . , N constitute desired BW 915. If the number of eigenvalues detected in PRB 1 920 is one ($r_1=1$), then the subspace BIS BW expands 905 to the left by performing energy detection in PRBs 0, −1, . . . , and continues expanding until no eigenvalue is detected within a PRB as shown in FIG. 9A. Alternatively, if the number of eigenvalues detected in PRB 1 920 is zero ($r_1=0$), then the subspace BIS BW does not expand to the left, as illustrated in FIG. 9B.

In one method, an expansion to the right is performed similar to the left expansion 905. In another method, this expansion is combined with the subspace BIS operation in the next step of the proposed algorithm.

Figure 10:
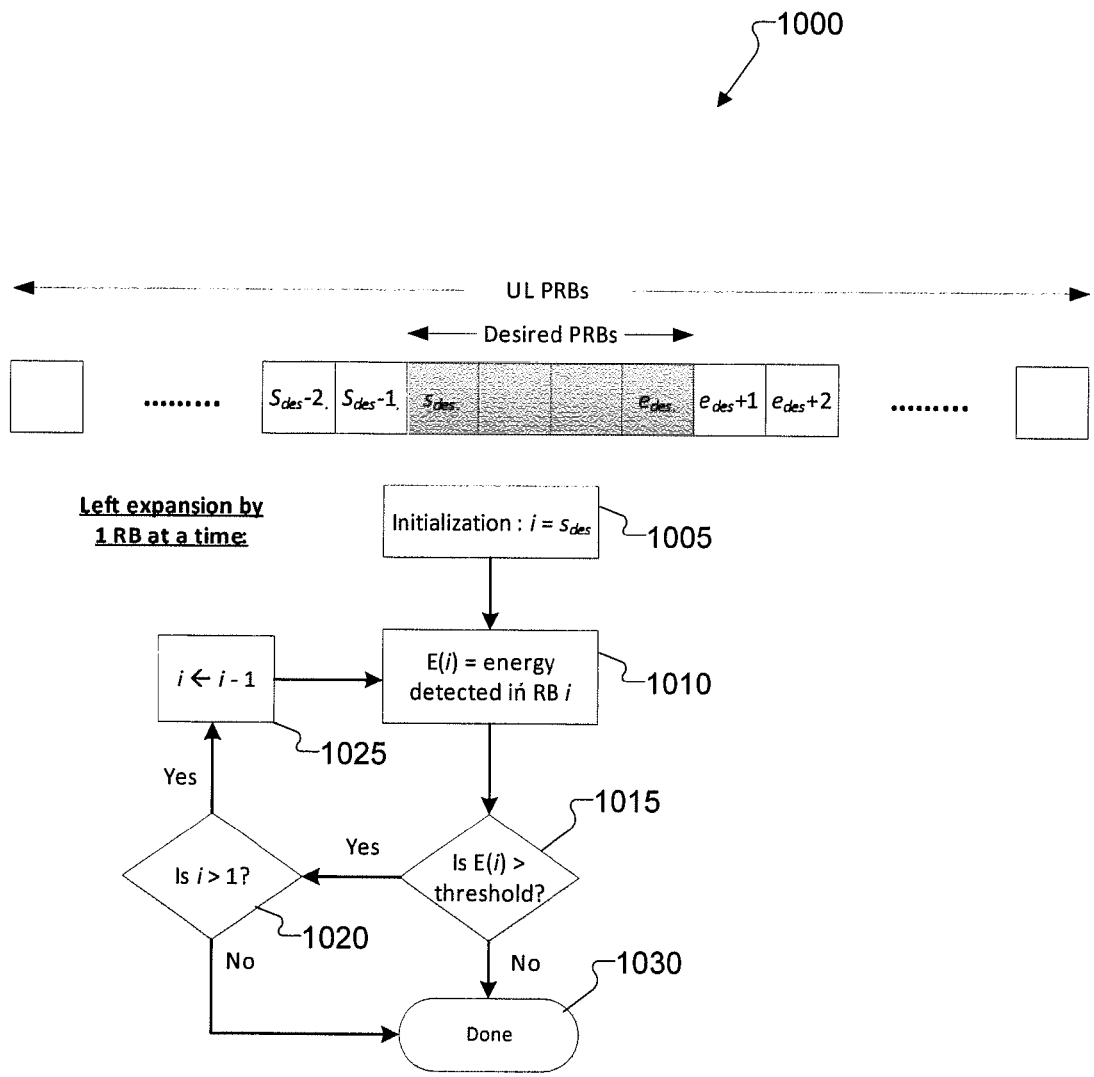
FIG. 10 illustrates the iterative left expansion procedure of subspace BIS algorithm according to embodiments of the present disclosure.

FIG. 10 illustrates another example of iterative left expansion procedure 1000 according to embodiments of the present disclosure. The embodiment shown in FIG. 10 is for illustration only. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a mobile station or a base station.

As shown, to determine the subspace BIS BW, we can expand to the left by 1 PRB in each iteration starting from the leftmost PRB in desired BW. In block 1005, i is initialized to $s_{des}$. In block 1010, energy E(i) is detected in PRB i. For PRB i, the energy E(i) based on the eigenvalue of the covariance matrix of received signal in PRB i is compared against a threshold in block 1015 and then it is determined whether i is greater than 1 in block 1020. If E(i) is more than the threshold and i is greater than 1, expansion occurs in block 1025 and the process continues, otherwise the process stops in block 1030.

Likewise, the subspace BIS BW can also expand to the right by 1 PRB in each iteration starting from the rightmost PRB in desired BW. In block 1005, i is initialized to $e_{des}$. In block 1010, energy E(i) is detected in PRB i. For PRB i, the energy E(i) based on the eigenvalue of the covariance matrix of received signal in PRB i is compared against a threshold in block 1015 and then it is determined whether i is smaller than the largest UL PRB index in block 1020. If E(i) is more than the threshold and i is greater than 1, expansion continues to the right in block 1025 and the process continues, otherwise the process stops in block 1030.

The subspace BIS block, such as via a BIS algorithm, performs interference case detection for two consecutive RBs (k, k+1) in the estimated subspace BIS BW by the steps:
 (1) detecting the number of interferers in RBs k and k+1; and
 (2) detecting the number of departing interferers, number of arriving interferers, and number of continuing interferes in the RB pair (k, k+1).

In step (1), the subspace BIS block detects the number of interferers in each RB using the eigenvalues of the covariance matrix of the received signal (after desired signal subtraction) in that RB.

The covariance matrix of RB k is the following Equation 1:

$$R_k = \frac{1}{|M_k|} \sum_{m \in M_k} y_{k,m} y_{k,m}^H = \qquad (1)$$

$$h_k^{(d)} h_k^{(d)H} + \sum_{l=1}^{L} h_k^{(i_l)} h_k^{(i_l)H} + \sigma_n^2 I = R_k^{(d)} + \sum_{l=1}^{L} R_k^{(i_l)} + \sigma_n^2 I$$

where $M_k$ is the set of received samples in RB k, $y_{k,m}$ is the received signal vector corresponding to resource element (RE) m in RB k, $h_k^{(d)}$ and $R_k^{(d)}$ are the desired signal vector and covariance matrix, $h_k^{(i_l)}$ and $R_k^{(i_l)}$ are the $i_l$-th interference signal vector and covariance matrix, L is the number of interferers, and $\sigma_n^2$ is the noise variance.

Assuming that the desired signal can be subtracted by the received signal perfectly, the covariance matrix without the desired signal for RB k is the following Equation 2:

$$\tilde{R}_k = \Sigma_{l=1}^{L} R_k^{(i_l)} + \sigma_n^2 I. \qquad (2)$$

The eigenvalue decomposition of $\tilde{R}_k$ is the following Equation 3:

$$\tilde{R}_k = [U_{i,k} U_{n,k}] \begin{bmatrix} D_k + \sigma_n^2 I & 0 \\ 0 & \sigma_n^2 I \end{bmatrix} \begin{bmatrix} U_{i,k} \\ U_{n,k} \end{bmatrix} \qquad (3)$$

where $U_{i,k}$ and $U_{n,k}$ respectively are the interference signal subspace and noise subspace. The eigenvalues of $\tilde{R}_k$ are used to determine the number of interferers in RB k. Let us use the notation $r_k$ to denote the number of interferers in RB k.

In step (2), the subspace BIS block uses the dimension or rank of the signal spaces of $\tilde{R}_k$ and $\tilde{R}_{k+1}$ concatenated together for detecting the total number of interferers in RBs k and k+1 together using the eigenvalues of the covariance matrix of the received signal (after desired signal subtraction) in RBs k and k+1 together.

The average of the covariance matrices of the two RBs is defined as Equation 4:

$$\tilde{R}_{k,k+1} = \frac{\tilde{R}_k + \tilde{R}_{k+1}}{2} \quad (4)$$

and the eigenvalue decomposition of $\tilde{R}_{k,k+1}$ is performed. The eigenvalues of $\tilde{R}_{k,k+1}$ are used to determine the dimension or rank of the signal spaces of $\tilde{R}_k$ and $\tilde{R}_{k+1}$ concatenated together. The notation $\delta_k$ is used to denote the eigenvalues of $\tilde{R}_{k,k+1}$. In some embodiments, the variable $\delta_k$ indicates a number of events comprising a start of a candidate interference BW in RB k+1, an end of a candidate interference BW in RB k, and a continuing candidate interference BW in consecutive RBs (k, k+1). Thus, the variable $\delta_k$ together with $r_k$ and $r_{k+1}$ distinguishes among the following three possibilities: the start of a candidate interference BW in PRB k+1; the end of a candidate interference BW in PRB k, and the continuing interference candidate BW in PRBs (k, k+1).

Figures 11A, 11B:
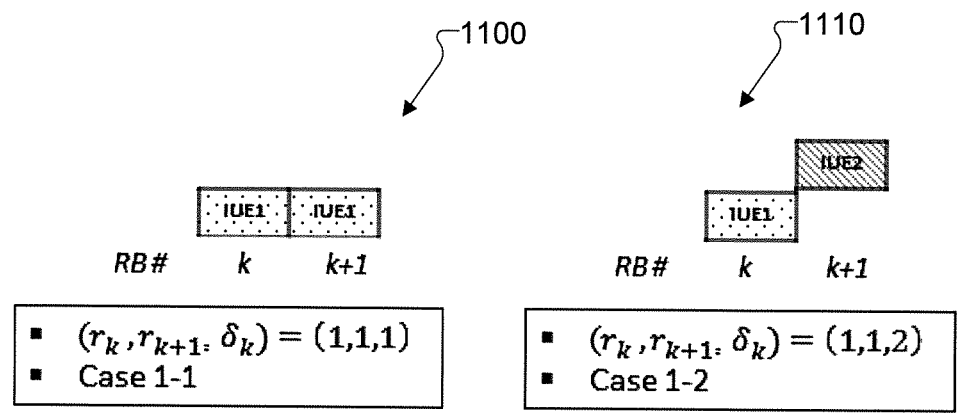
FIGS. 11A and 11B illustrate interference case detections using $(r_k, r_{k+1}, \delta_k)$ according to embodiments of the present disclosure.

FIGS. 11A and 11B illustrate interference case detections 1100, 1110 using ($r_k$, $r_{k+1}$, $\delta_k$) according to some embodiments of the present disclosure. The embodiment shown in FIGS. 11A and 11B are for illustration only. Other embodiments could be used without departing from the scope of the present disclosure.

As illustrated, the detected value of ($r_k$, $r_{k+1}$, $\delta_k$) is used to determine a valid interference case. For example, if ($r_k$, $r_{k+1}$, $\delta_k$)=(1,1,1), the base station has an interfering user IUE1 in both RBs k and k+1, as shown in FIG. 11A. If ($r_k$, $r_{k+1}$, $\delta_k$)=(1,1,2), the base station has an interfering user IUE1 in RB k and another interfering user IUE2 in RB k+1, as shown in FIG. 11B. The details of different valid interference cases depending on the value of ($r_k$, $r_{k+1}$, $\delta_k$) are provided in FIGS. 22A through 22D.

In certain embodiments, the detected value of ($r_k$, $r_{k+1}$, $\delta_k$) is obtained based on the threshold test on the eigenvalues of the covariance matrix of the received signal. The eigenvalue matrix of the covariance matrix of the received signal is Equation 5:

$$\begin{bmatrix} \sigma_n^2\left(I + \frac{D_k}{\sigma_n^2}\right) & 0 \\ 0 & \sigma_n^2 I \end{bmatrix} \quad (5)$$

where $$\frac{D_k}{\sigma_n^2}$$

is the achieved Interference to Noise power Ratio (INR), and $$\sigma_n^2\left(I + \frac{D_k}{\sigma_n^2}\right)$$

is a function of the achieved INR.

Then, the threshold test is given by Equation 6:

$$\sigma_n^2\left(I + \frac{D_k}{\sigma_n^2}\right) \geq T, \quad (6)$$

where T is the threshold, for example, $$T = \sigma_n^2\left(1 + 10^{\left(\frac{T_{INR}}{10}\right)}\right)$$

is the threshold as a function of target INR, $T_{INR}$ in dB.

In certain embodiments, the thresholds for $r_k, r_{k+1}$, and $\delta_k$ are the same. In other embodiments, the thresholds are different. In certain embodiments, the thresholds may be the function of eigenvalues. In certain embodiments, the threshold may be different for different eigenvalues. For example, the threshold for the largest eigenvalue may be the largest; the threshold for the second eigenvalue may be smaller than that for the largest eigenvalue, and so on. In certain embodiments, the threshold may be chosen to be a value in between a lower and upper bounds as shown in the following Equation 7:

Lower bound:$L \leq$Threshold:$T=f(U,L)\leq$Upper bound: $U$. (7)

In certain embodiments, the detected value of ($r_k$, $r_{k+1}$, $\delta_k$) is obtained based on the threshold test on a few dominant eigenvalues (not all eigenvalues) of the covariance matrix of the received signal. For example, all eigenvalues may be sorted first and then a threshold test is performed starting from the largest eigenvalue. The test continues in the sorted order until a target percentage of sum interference power is detected.

In certain embodiments, the threshold test for ($r_k$, $r_{k+1}$, $\delta_k$) is performed according to the following algorithm tabulated in Table 1.

TABLE 1

Threshold Test

Let $\lambda_i$, i = 1, ..., N be the eigenvalues sorted in the decreasing order, where N is the number of eigenvalues. Let $T_{INR}$ be the target INR in dB, and $P_{dominant}$ be the target percentage of sum interference power that is to be detected.

Initialization: I = [ ], $\lambda_0 = \infty$.
For i = 1, 2, ..., N
    Upper bound:  $U$ (Ex: $U = \min(\lambda_{i-1}, \Sigma_i^N \lambda_i)$)
    Lower bound:  $L$ (Ex: $L = \sigma_n^2\left(1 + 10^{\frac{T_{INR}}{10}}\right)$)
    Choose a suitable threshold: T (Ex: T = 0.5 * (U + L ))
    If $\lambda_i$ > T (Threshold test)
        Include i in set I
        If $\Sigma_{i \in I} \lambda_i / \Sigma_i \lambda_i > P_{dominant}$ (Stop if target % of sum interference power
            is reached)
            Break;
        End if
    Else
        Break; (Stop if eigenvalue i fails threshold test)
    End if
End For
Number of detected eigenvalues = size of set I.

In certain embodiments, the noise variance $\sigma_n^2$ is estimated using the smallest eigenvalue of the average covariance of received signal after desired signal subtraction. Note that this is reasonable if the number of dominant interferers is less than the number of receive antennas or eigenvalues.

In certain embodiments, the estimated value of $\sigma_n^2$ is equal to the smallest eigenvalue in a particular PRB. In other embodiments, the estimated value of $\sigma_n^2$ is obtained by averaging the smallest eigenvalues over the desired user PRB allocations, i.e.

$$\sigma_n^2 = \frac{1}{N_d} \sum_{i=1}^{N_d} \lambda_{smallest}(i),$$

where $N_d$ is the number of desired user PRBs, and $\lambda_{smallest}(i)$ is the smallest eigenvalue for PRB i. In yet other embodiments, the estimated value of $\sigma_n^2$ is obtained by averaging the smallest eigenvalues over the subspace BIS BW.

In certain embodiments, the detected value of $(r_k, r_{k+1}, \delta_k)$ is obtained based on the model selection that fits the data (received signal after desired signal subtraction).

The model selection based on the maximum aposteriori probability is provided in M. Wax and T. Kailath "Detection of Signals by Information Theoretic Criteria," IEEE Tr. Acous. Speech. Sig. Proc. 1985, which is incorporated in this disclosure in its entirety. Assuming i.i.d. complex Gaussian received sample of zero mean, the detected value of $r_k$, $(r_{k+1}$, and $\delta_k)$ is the value of k E {0, 1, . . . , p–1} for which Equation 8:

$$MDL(k) = \log\left(\frac{\prod_{i=k+1}^{p} l_i^{\frac{1}{p-k}}}{\frac{1}{p-k}\sum_{i=k+1}^{p} l_i}\right)^{(p-k)N} + \frac{1}{2}k(2p-k)\log N \quad (8)$$

is minimized, where p is number of Rx antennas, and $l_i$ is the i-th eigenvalue of the covariance matrix sorted in descending order, and N is the number of received samples. In certain embodiments, the subspace BIS block performs interference case detection for all pairs of consecutive RBs in the estimated subspace BIS BW, and aggregate arrivals (or starts) and departures (or ends) of detected interferer BWs over the entire subspace BIS BW, which in turn gives us a set of candidate interference BWs.

Figure 12:
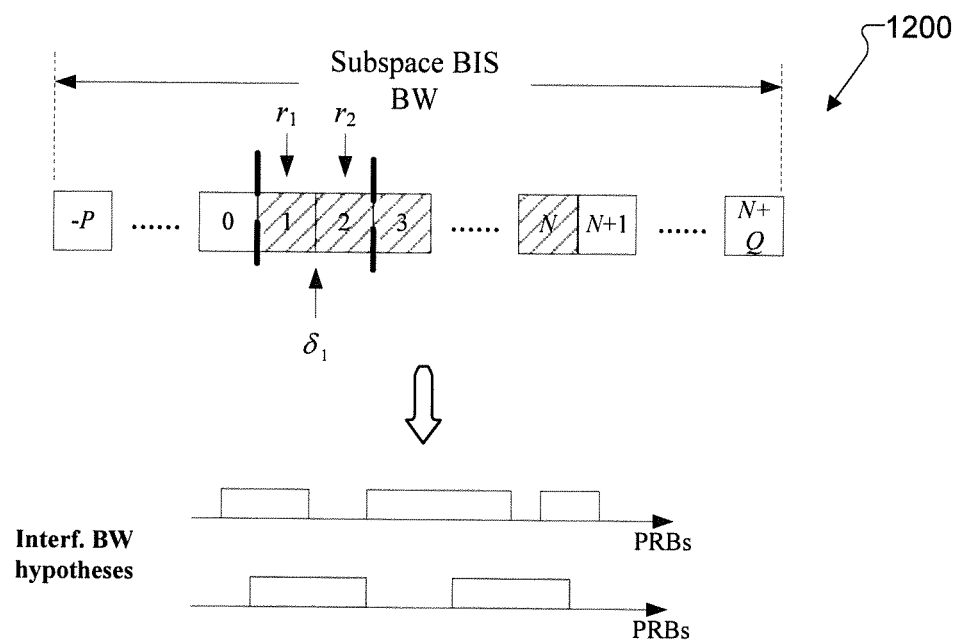
FIG. 12 illustrates the subspace interference BW set determination 1200 according to embodiments of the present disclosure.

FIG. 12 illustrates the subspace interferences BW set determination 1200 according to some embodiments of the present disclosure. The embodiment shown in FIG. 12 is for illustration only. Other embodiments could be used without departing from the scope of the present disclosure.

As shown in FIG. 12, the RBs 1, 2, . . . , N are desired RBs and RBs–P, . . . , 0 and N+1, . . . , N+Q are the left and right expansions. The set of interference BWs obtained has five candidates 1205 to 1210.

Figure 13:
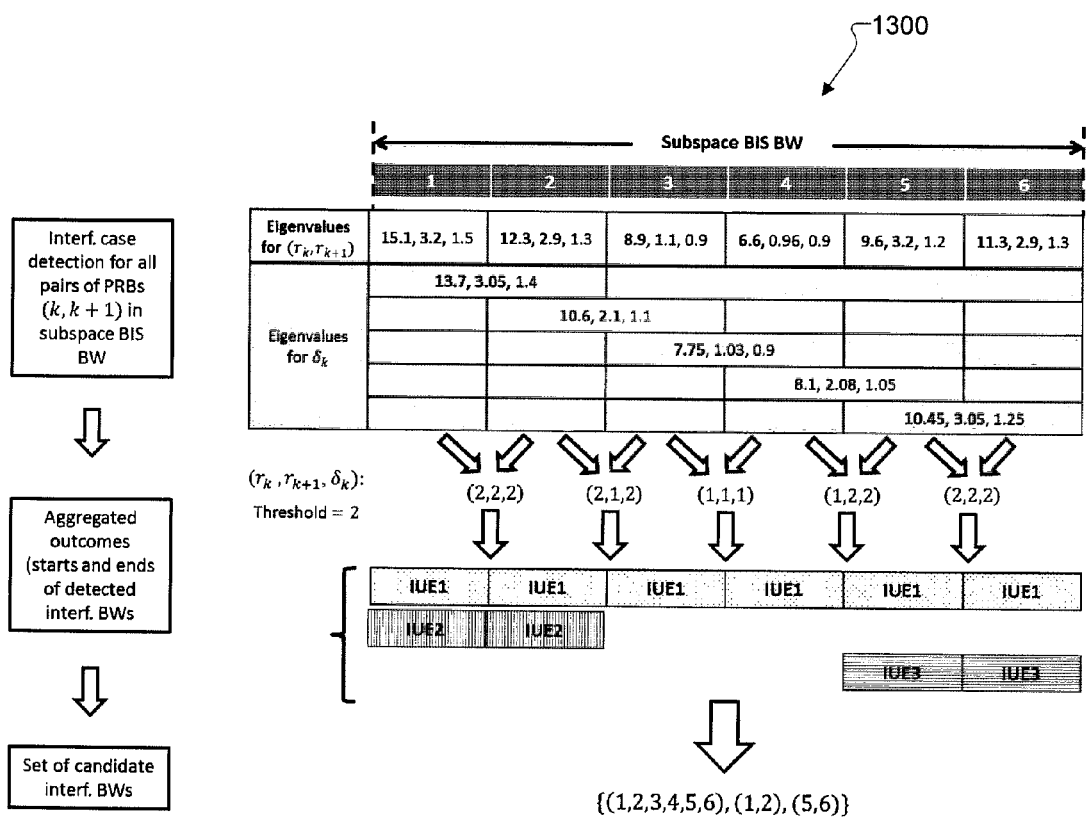
FIG. 13 illustrates another example interference BW set determination 1300 according to embodiments of this disclosure.

FIG. 13 illustrates another example interference BW set determination 1300 according to some embodiments of this disclosure. As shown in FIG. 13, for example, $r_1$ is determined from eigenvalues (15.1, 3.2, 1.5), $r_2$ is determined from eigenvalues (12.3, 2.9, 1.3), $r_3$ is determined from eigenvalues (8.9, 1.1, 0.9), $r_4$ is determined from eigenvalues (6.6, 0.96, 0.9), $r_5$ is determined from eigenvalues (9.6, 3.2, 1.2), and $r_6$ is determined from eigenvalues (11.3, 2.9, 1.3). And $\delta_1$ is determined from eigenvalues (13.7, 3.05, 1.4), $\delta_2$ is determined from eigenvalues (10.6, 2.1, 1.1), $\delta_3$ is determined from eigenvalues (7.75, 1.03, 0.9), $\delta_4$ is determined from eigenvalues (8.1, 2.08, 1.05), $\delta_5$ is determined from eigenvalues (10.45, 3.05, 1.25). For all pairs of consecutive PRBs (k, k+1) in subspace BIS BW, eigenvalues for $(r_k, \delta_k)$ detection are compared against the threshold=2.

Then, the five detected values of $(r_k, r_{k+1}, \delta_k)$: (2, 2, 2), (2, 1, 2), (1, 1, 1), (1, 2, 2), and (2, 2, 2) are mapped to five interference cases. Aggregating these interference cases results in three candidate interference BW candidates, which are (1, 2, 3, 4, 5, 6), (1, 2), and (5, 6).

When the detected triples $(r_k, r_{k+1}, \delta_k)$ are mapped to interference cases, there can be some cases where the interference case detection for some pairs of consecutive RBs in subspace BIS BW needs to be improved. Below are three example improvements. Any other potential improvements can be similarly included in the algorithm.

Figure 14A:
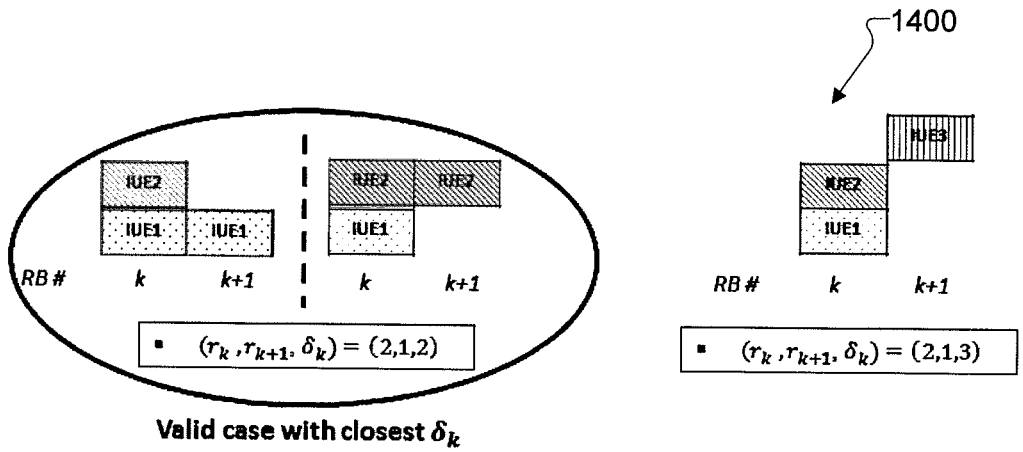
FIG. 14A illustrates an example invalid case mapping 1400 according to embodiments of the present disclosure.

FIG. 14A illustrates an example invalid case mapping 1400 according to some embodiments of the present disclosure. If the value of $(r_k, r_{k+1}, \delta_k)$ does not map to any of the valid interference cases, then it is mapped to one of the valid interference cases with the same $(r_k, r_{k+1})$ value according to one of the following options. In option A-1, the mapping is random with the assumption that all valid interference cases are equally likely. In option B-1, the mapping is based on the prior knowledge about the valid interference cases. In option C-1, it is mapped to a valid interference case with the closest $\delta_k$ value.

For example, as shown in FIG. 14A, the detected triple $(r_k, r_{k+1}, \delta_k)=(2,1,1)$ does not map to any of the valid interference cases, $(r_k, r_{k+1}, \delta_k)=(2,1,2)$ or $(r_k, r_{k+1}, \delta_k)=(2,1,3)$. Then, in option A-1, it is randomly mapped to either $(r_k, r_{k+1}, \delta_k)=(2,1,2)$ or $(r_k, r_{k+1}, \delta_k)=(2,1,3)$. In option B-1, it is mapped to the one which has higher probability based on the prior knowledge. In option C-1, it is mapped to $(r_k, r_{k+1}, \delta_k)=(2,1,2)$ because it has the closest $\delta_k$ value.

Figure 14B:
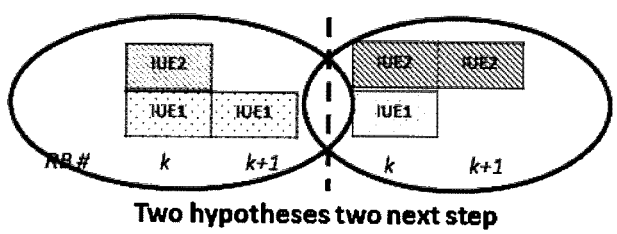
FIG. 14B illustrates determining a continuous BW determination 1410 according to some embodiments of the present disclosure.

FIG. 14B illustrates determining a continuous BW determination 1410 according to certain embodiments of the present disclosure. If the value of $(r_k, r_{k+1}, \delta_k)$ is such that an interferer departs in RB k+1 and there are more than one interferer in RB k, then a decision whether an interference BW continues or ends in RB k+1 is made according to one of the following options. In option A-2, the decision is random with the assumption that all interference BWs are equally likely. In option B-2, the decision is based on the prior knowledge about the interference BWs. In option C-2, multiple interference BW hypotheses are created for the next step, such that in each hypothesis the detected number of interferers departs. In option D-2, the decision is based on the eigenvalues obtained in RBs earlier than k.

For example, when $(r_k, r_{k+1}, \delta_k)=(2,1,2)$ is detected, a decision needs to be made as to which of the two interferers, IUE1 and IUE2, departed in RB k+1. In option A-2, the decision is made by randomly assuming both are equally likely to depart. In option B-2, the decision is made randomly with the assumption of prior knowledge. In option C-2, two interference BW hypotheses are created for the next step of the algorithm, as shown in FIG. 14B.

Figure 14C:
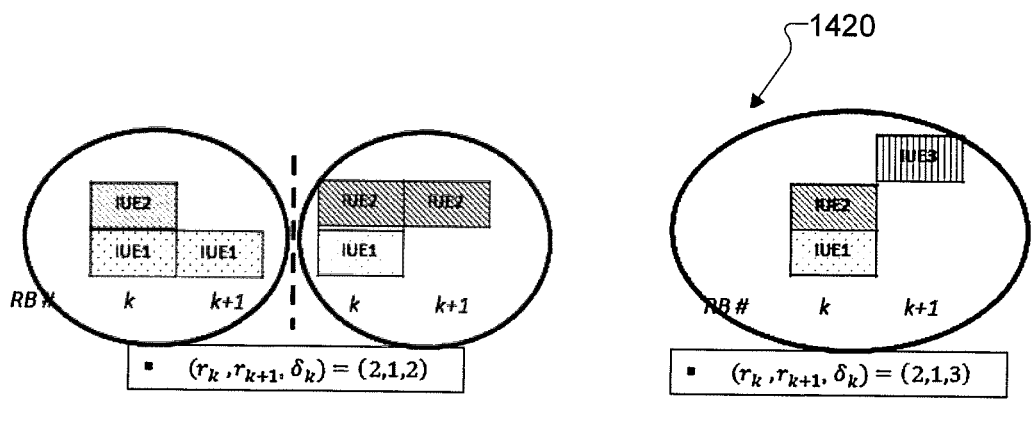
FIG. 14C illustrates the all interferer departure mapping 1420 according to embodiments of the present disclosure.

FIG. 14C illustrates the all interferer departure mapping 1420 according to some embodiments of the present disclosure. If the value of $(r_k, r_{k+1}, \delta_k)$ is such that all interferers are detected to depart in RB k+1, then it is either mapped to another valid case or create multiple hypotheses because such cases occur less frequently in practice than other cases, and may lead to severe detection errors in later steps. In option A-3, such a case is mapped to a valid case in which one interferer does not depart. For example, map $(r_k, r_{k+1}, \delta_k)$ to $(r_k, r_{k+1}, \delta_k-1)$. In option B-3, is mapped to a valid case based on the prior knowledge. In option C-2, multiple hypotheses are created to next step. For example, both ($r_k$, $r_{k+1}$, $\delta_k$) and ($r_k$, $r_{k+1}$, $\delta_k-1$) are maintained.

For example, as shown in FIG. 14C, when ($r_k$, $r_{k+1}$, $\delta_k$)=(2,1,3) is detected, both interferers, IUE1 and IUE2, depart in RB k+1. When this case is detected, it is mapped to the case ($r_k$, $r_{k+1}$, $\delta_k$)=(2,1,2) in option A-3, it is mapped to a valid case, for example ($r_k$, $r_{k+1}$, $\delta_k$)=(2,1,2), based on the prior knowledge in option B-3, or create two hypotheses, ($r_k$, $r_{k+1}$, $\delta_k$)=(2,1,2) and (2,1,2), in option C-3.

Figure 15:
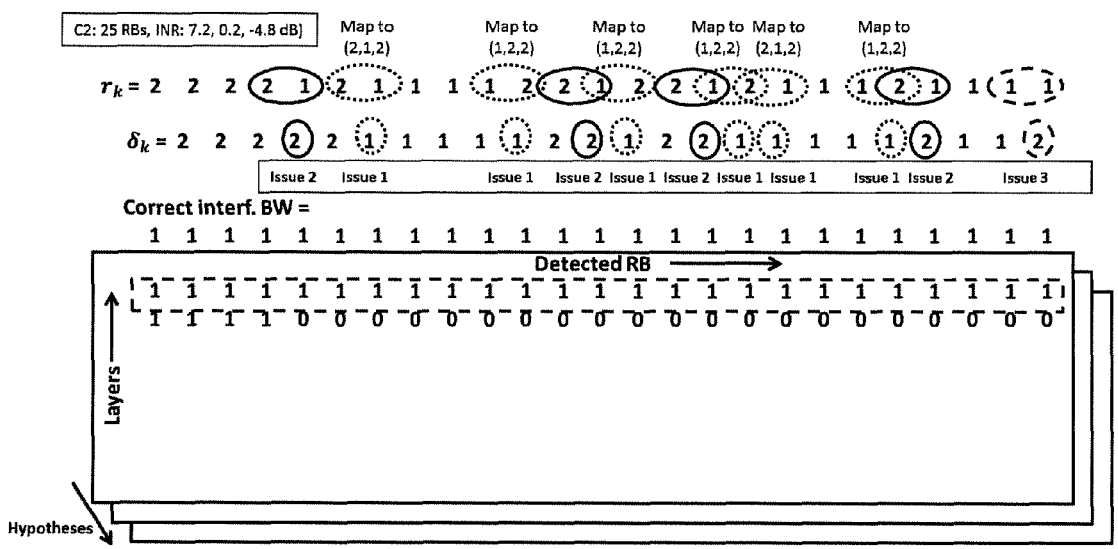
FIG. 15 illustrates a snapshot of the algorithm with the three issues addressed according to the options C-1, C-2, and C-3 according to embodiments of the present disclosure.

FIG. 15 illustrates a snapshot of the algorithm with the three issues addressed according to the options C-1, C-2 and C-3 according to embodiments of the present disclosure. This snapshot 1500 shown in FIG. 15 has the following issues: six of the invalid case mappings (issue 1) which are ($r_k$, $r_{k+1}$, $\delta_k$)=(2, 1, 1), (1, 2, 1), (1, 2, 1), (1, 2, 1), (2, 1, 1) and (1, 2, 1); four of a continuous BW determination (issue 2), which are ($r_k$, $r_{k+1}$, $\delta_k$)=(2, 1, 2), (2, 1, 2), (2, 1, 2), and (2, 1, 2); and one of all interferer departure (issue 3), which is ($r_k$, $r_{k+1}$, $\delta_k$)=(1, 1, 2).

In some embodiments, option C-1 is applied to address the issue 1, and the six triple values ($r_k$, $r_{k+1}$, $\delta_k$) are mapped to (2, 1, 2), (1, 2, 2), (1, 2, 2), (1, 2, 2), (2, 1, 2), and (1, 2, 2), respectively. In some embodiments, option C-2 is applied to address issue 2 and option C-3 is applied for issue 3, which generate a total of $2^5$=32 hypotheses. As shown, there are 32 interference hypotheses, and the one of them (top hypothesis) includes the correct interference BW.

Figure 16:
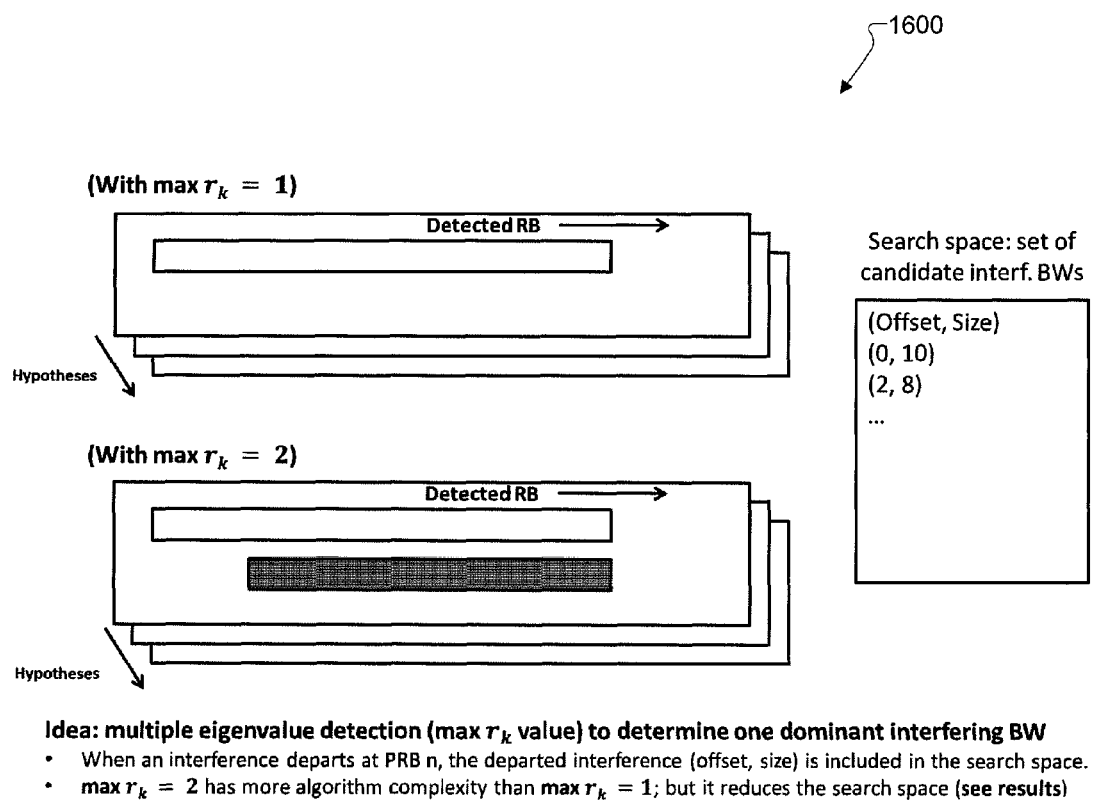
FIG. 16 illustrates two variants of the algorithm 1600 according to embodiments of the present disclosure.

FIG. 16 illustrates two variants of the algorithm 1600 according to some embodiments of the present disclosure. A candidate interference hypothesis can have multiple interference BW candidates (maximum value of $r_k$ or maximum number of interference layers) to determine one dominant interfering BW. For example, as shown in FIG. 16, two instances of the algorithm are shown for max $r_k$=1 and max $r_k$=2.

The algorithm complexity depends on the value of max $r_k$ (number of layers). For example, the complexity for max $r_k$=1 is less than that for max $r_k$=2. However, since the BIS subspace size is more for max $r_k$=1 than that for max $r_k$=2, the performance of the subspace BIS algorithm with max $r_k$=1 is better than the same with max $r_k$=2 because the performance improves with increasing size of BIS subspace in general.

Figure 17:
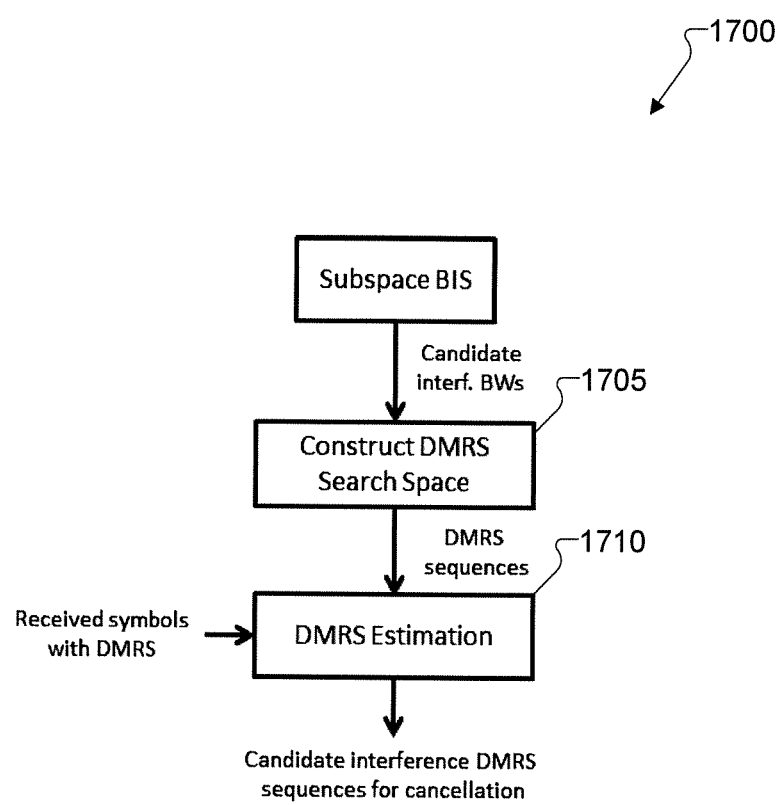
FIG. 17 illustrates a diagram of the DMRS BIS algorithm 1700 according to embodiments of the present disclosure.

FIG. 17 illustrates a diagram of the DMRS BIS block 1700 according to some embodiments of the present disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a processing circuitry in, for example, a base station.

As shown in FIG. 17, a BS (e.g., an eNB such as eNB 102) performs the DMRS BIS using the candidate interference BWs obtained. A DMRS search space is constructed in block 1705. In block 1710, candidate DMRS estimation of the interferers may be performed based on the cross-correlation between the received signal (y-h$^{(d)}$x$^{(d)}$) and all possible DMRS sequences {(u, $n_{cs}$, n, k)} that satisfy: u∈U$_0$, set of all u of adjacent cells; $n_{cs}$∈{0, . . . , 11}, cyclic shift; 1≤n≤N$_{RB}^{UL}$, size; k∈{0, . . . , k$_{Max}$}, k$_{Max}$=N$_{RB}^{UL}$-size; and (n, k) is a candidate interference BW from the subspace BIS block.

The following simulation results are provided for the subspace (SS) BIS algorithm. Results are provided for 1 interference layer (max $r_k$ value=1) and are compared with the full DMRS search. The relevant information about the simulation environment is as follows: 10 MHz BW (50 RBs); perfectly overlap of desired and interference BWs; Ped. B channel and AWGN; SNR is 0 dB; u and $n_{cs}$ are random; and 3 interference cases as listed in the following Table 2:

TABLE 2

| | Case 1 (36 RBs) | | Case 2 (25 RBs) | | Case 3 (12 RBs) | |
|---|---|---|---|---|---|---|
| | INR (in dB) | MSC | INR (in dB) | MSC | INR (in dB) | MSC |
| Desired UE | — | 8 | — | 10 | — | 12 |
| Interf. #1 | 8.3 | 10 | 7.2 | 12 | 4.6 | 13 |
| Interf. #2 | 2.3 | 9 | 0.2 | 9 | −5.8 | 14 |
| Interf. #3 | −1.6 | 8 | −4.8 | 10 | −14 | 12 |

Figure 19:
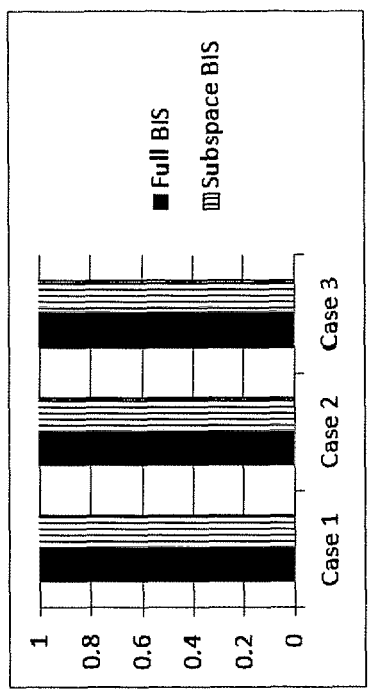
FIG. 19 illustrates a chart to show that the correct interference BW is always included in the reduced subspace with probability close to 1.
Figure 20:
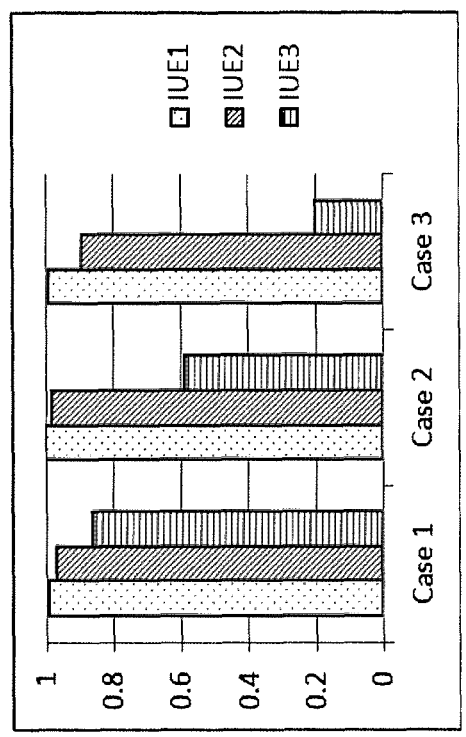
FIG. 20 illustrates the detection probabilities of the three DMRS sequences corresponding to the three interferers.
Figure 18:
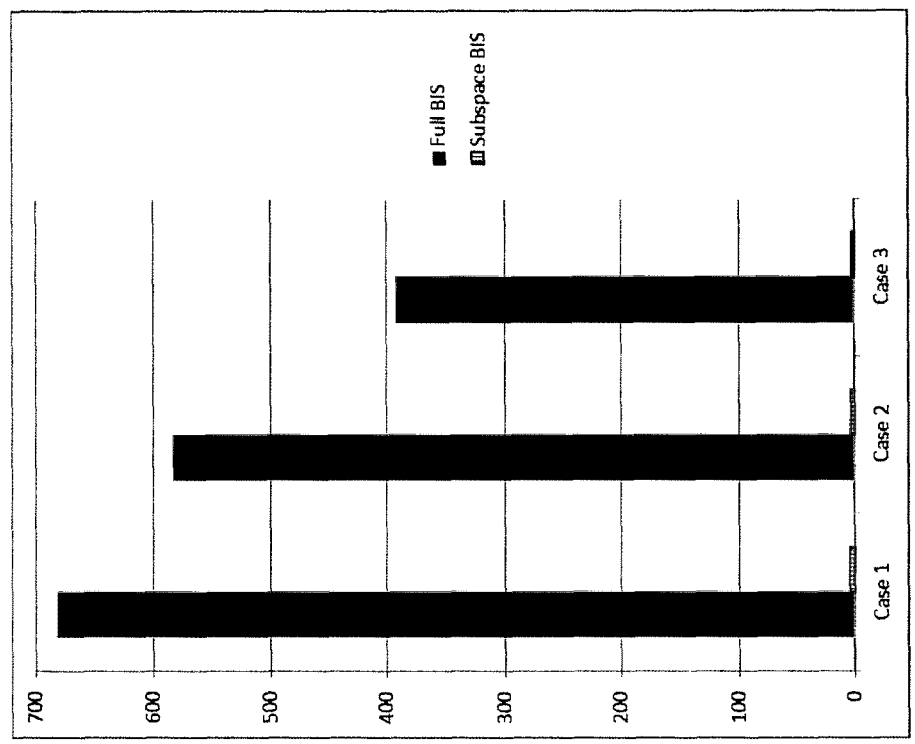
FIG. 18 shows reduction in DMRS search space according to embodiments of the present disclosure.

FIG. 18 shows reduction in DMRS search space: the number of candidate interference BWs according to some embodiments of the present disclosure. As shown, large search space reduction (>184 times) is achieved with the proposed subspace algorithm compared to the full DMRS search space. Also, as shown in FIG. 19, the correct interference BW is always included in the reduced subspace with probability close to 1. FIG. 20 illustrates the detection probabilities of the three DMRS sequences corresponding to the three interferers, IUE1, IUE2, and IUE3. As shown, at least two interfering DMRS sequences corresponding to the two dominating interferes are detected with high probability, more than 0.85.

Valid and invalid interference cases can be predetermined and saved, for example, in appendix A. Let us assume that (1) we can have at most $N_1$=3 interferers per PRB, and (2) there are $N_{Rx}$=4 antennas at the receiver. The universe set {0≤$r_k$, $r_{k+1}$, $\delta_k$≤min ($N_I$, $N_{Rx}$)} comprises both valid and invalid interference cases. The valid interference cases are such that their ($r_k$, $r_{k+1}$, $\delta_k$) values satisfy the following condition: max($r_k$, $r_{k+1}$)≤$\delta_k$≤$r_k$+$r_{k+1}$, where 0≤$r_k$, $r_{k+1}$, $\delta_k$ min($N_I$, $N_{Rx}$); Invalid (or impossible) cases are all the other cases that are physically impossible.

Figure 21:
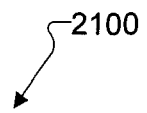
FIG. 21 shows all valid cases in cross-hashed patterns and invalid interference cases without any patterns.

If the interference case detection for a pair of consecutive RBs (k, k+1) is performed, then depending on the outcome, an interference case can be detected that is physically valid or an invalid case. FIG. 21 shows all valid cases in cross-hashed elements and invalid interferences cases in non-cross-hashed elements.

FIG. 22A through FIG. 22D respectively illustrate how to map index tuple ($r_k$, $r_{k+1}$, $\delta_k$) to a valid interference case with $r_k$=0 through $r_k$=3 according to some embodiments of the present disclosure, wherein $r_k$ is the number of interferer in kth RB.

Figure 22A:
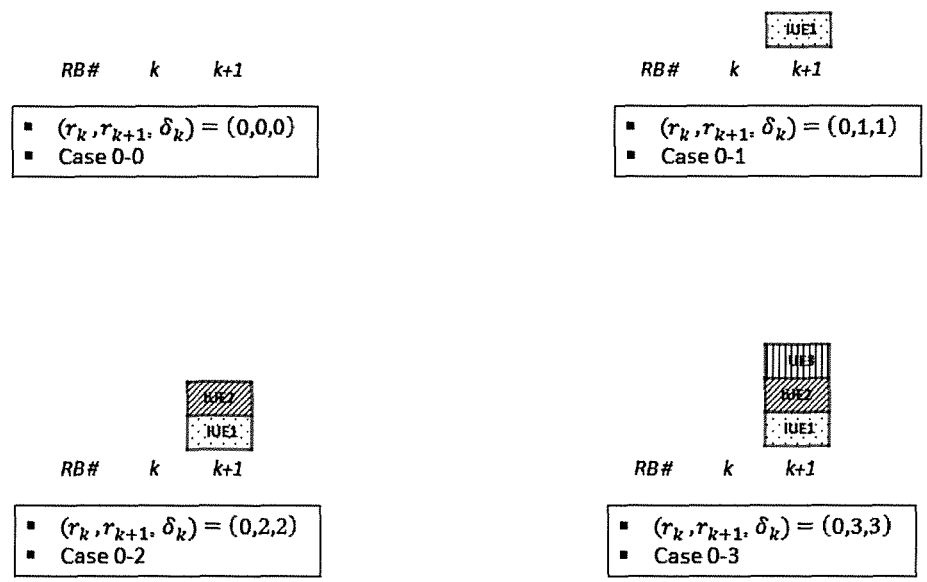
FIGS. 22A, 22B, 22C, and 22D respectively illustrate how to map index tuple $(r_k, r_{k+1}, \delta_k)$ to a valid interference case with $r_k=0$ through $r_k=3$ according to embodiments of the present disclosure, wherein $r_k$ is the number of interferer in kth RB.

For example, FIG. 22A illustrates a method to map four such tuples with $r_k$=0 to valid interference cases according to some embodiments of the present disclosure. According to the FIGURE, the following mapping is defined: An index tuple of ($r_k$, $r_{k+1}$, $\delta_k$)=(0,0,0) maps to an interference scenario wherein there are no interferences in RBs k and k+1; An index tuple of ($r_k$, $r_{k+1}$, $\delta_k$)=(0,1,1) maps to an interference scenario wherein 0 interfering UE in RBs k and 1 interfering UE in RB k+1; An index tuple of ($r_k$, $r_{k+1}$, $\delta_k$)=(0,2,2) maps to an interference scenario wherein 0 interfering UE in RBs k and 2 interfering UE in RB k+1; An index tuple of ($r_k$, $r_{k+1}$, $\delta_k$)=(0,3,3) maps to an interference scenario wherein 0 interfering UE in RBs k and 3 interfering UE in RB k+1. The mapping in other figures can also be similarly defined.

Figure 22B:
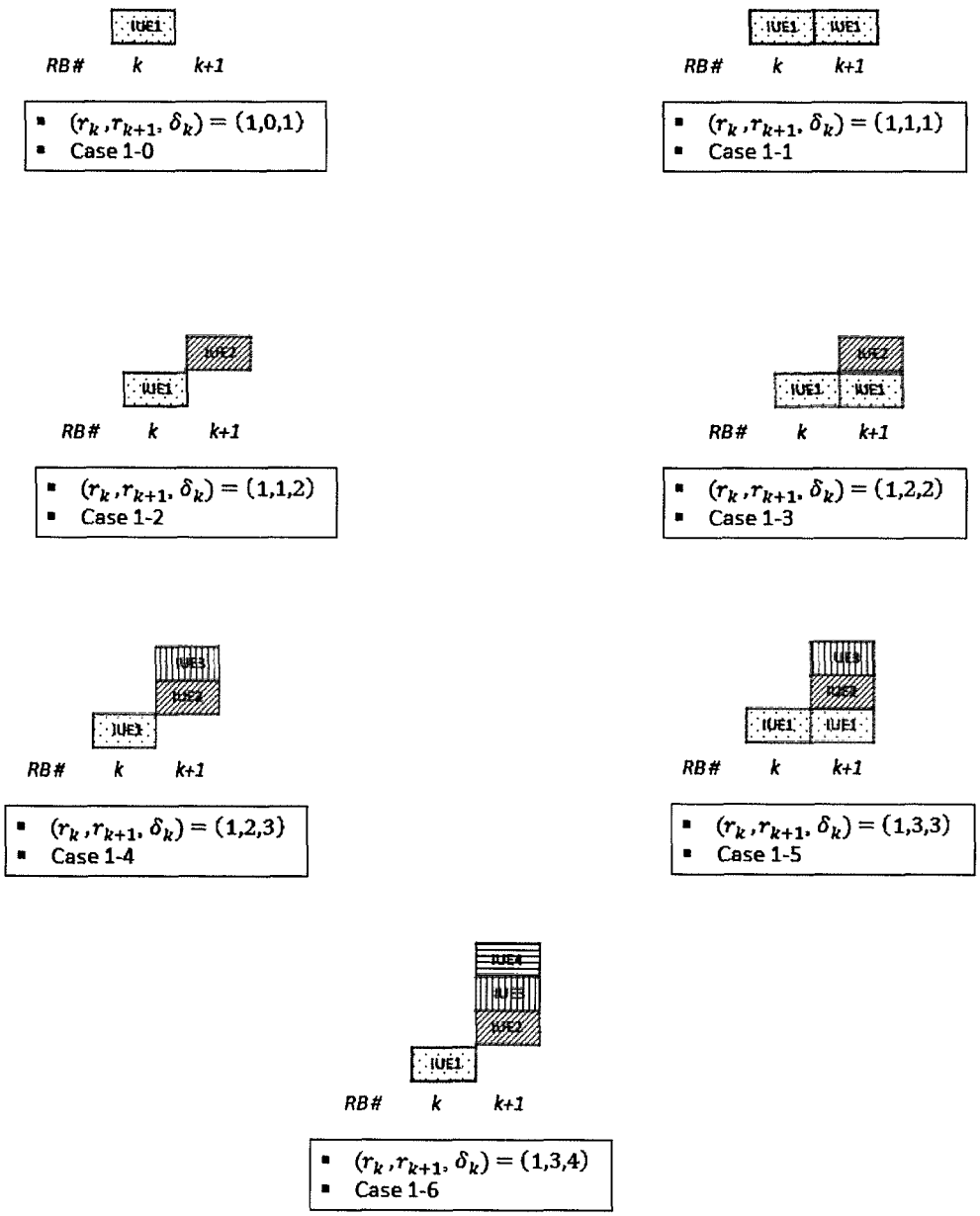
Figure 22C:
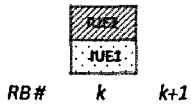
Figure 22C:
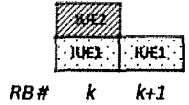
Figure 22C:
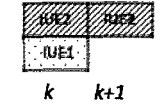
Figure 22C:
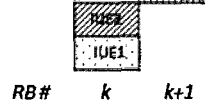
Figure 22C:
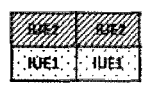
Figure 22C:
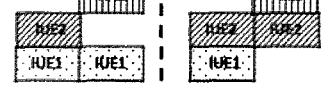
Figure 22C:
Figure 22C:
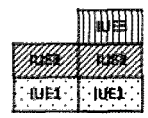
Figure 22C:
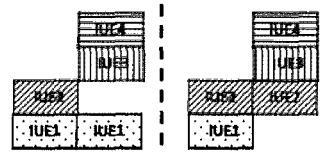
Figure 22C:
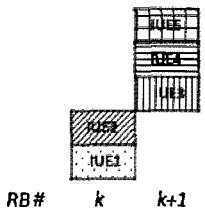
Figure 22D:
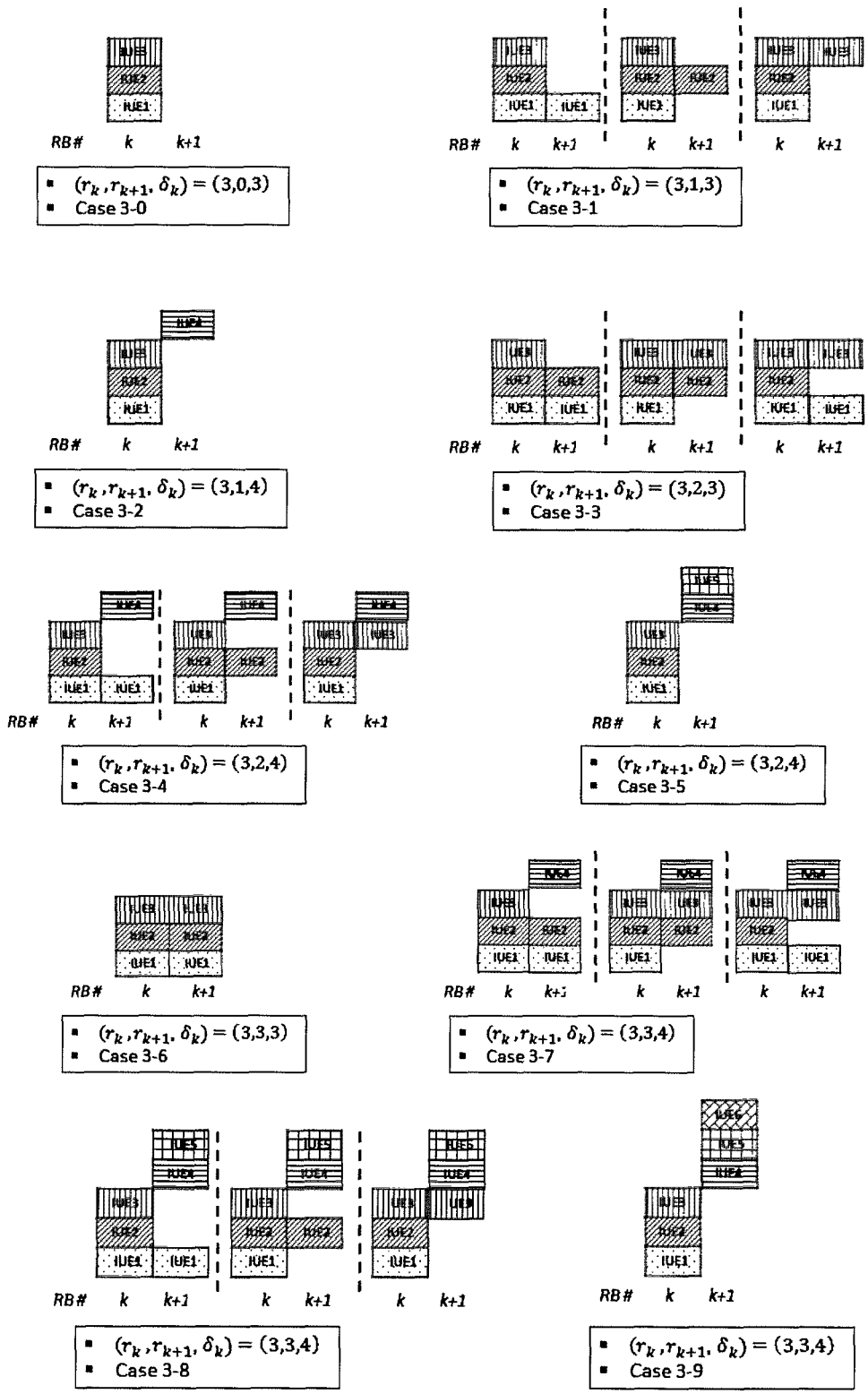

FIG. 22A shows valid interference cases with $r_k=0$, FIG. 22B shows valid interference cases with $r_k=1$, FIG. 22C shows valid interference cases with $r_k=2$, and FIG. 22D shows valid interference cases with $r_k=3$.

Although the present disclosure has been described with an exemplary embodiment, various changes and modifications may be suggested to one skilled in the art. It is intended that the present disclosure encompass such changes and modifications as fall within the scope of the appended claims.

What is claimed:

1. A method for mitigating interference in a wireless communication system, the method comprising:
   receiving a signal transmitted from a mobile station;
   subtracting a target signal within a target bandwidth (BW) from the received signal to obtain a resultant signal, wherein the target signal is constructed by estimating a target channel and target symbols from the received signal;
   determining a subspace blind interference sensing (BIS) BW by extending resource blocks (RBs) in a frequency domain prior to a starting RB and after an ending RB of the target bandwidth using energy detection in each RB;
   determining a set of candidate interfering BWs in the subspace BIS BW by determining a number of interferers in each RB in the subspace BIS BW;
   determining a set of candidate interfering DeModulation Reference Signal (DMRS) sequence parameters $\{(u, n_{cs}, n, k)\}$ based on the set of candidate interfering BWs by performing DMRS detection for each candidate interfering BW, wherein u is a group number and $n_{cs}$ indicates a cyclic shift parameter and n and k are determined based on the candidate interfering BW; and
   performing interference cancellation based on the determined set of candidate interfering DMRS sequence parameters.

2. The method of claim 1, further comprising:
   constructing interfering signals within the subspace BIS BW based on the set of candidate interfering DMRS sequence parameters, wherein interfering signals are constructed by estimating interfering channels and interfering symbols;
   subtracting the constructed interfering signals from the received signal;
   decoding a target data signal from the resultant signal;
   in response to decoding the target data signal from the resultant signal being failed,
      setting the resultant signal to be the signal after subtracting the constructed interfering signals from the received signal, and
      going back to determining the subspace BIS BW on the resultant signal.

3. The method of claim 1, further comprising:
   decoding the received signal after receiving the signal transmitted from a transmitter; and
   in response to decoding the received signal being failed, proceeding to subtracting the target signal within the target BW from the received signal.

4. The method of claim 1, further comprising:
   calculating respective triple values of $(r_k, r_{k+1}, \delta_k)$ for all pairs of consecutive RBs (k, k+1) in the subspace BIS BW, where $r_k$ and $r_{k+1}$ are determined based on eigenvalues of two separate covariance matrices for RBs k and k+1, respectively, and $\delta_k$ is determined based on eigenvalues of a joint covariance matrix for two consecutive RBs k and k+1 together, wherein the two separate covariance matrices are obtained using the signal resulting from subtracting the target signal from the received signal.

5. The method of claim 4, wherein the respective triple values of $(r_k, r_{k+1}, \delta_k)$ are determined by comparing the respective eigenvalues of the two separate covariance matrices for the two consecutive RBs to at least one threshold, wherein the threshold is chosen to be a value in between a lower bound and an upper bound.

6. The method of claim 5, wherein the lower and upper bounds for different eigenvalues are either the same or different, and are determined as functions of parameters including eigenvalues.

7. The method of claim 5, wherein $r_k$ and $r_{k+1}$ indicate the number of interferers in RBs k and k+1, respectively, and $\delta_k$ indicates the number of interferers in RBs k and k+1 together.

8. The method of claim 4, further comprising:
   mapping the triple value of $(r_k, r_{k+1}, \delta k)$ for consecutive RBs k and k+1 to a respective valid interference case;
   aggregating the interference cases for all pairs of consecutive RBs (k, k+1) in the subspace BIS BW to obtain a set of candidate interference BWs $\{(n, k)\}$, where n and k correspond to size and offset parameters of a candidate interference BW, respectively;
   obtaining a set of all possible DMRS sequence parameters $\{(u, n_{cs}, n, k)\}$ for all interference BWs in the set of candidate interference BW; and
   performing DMRS detection over a set of all possible DMRS sequences to obtain the set of candidate interfering DMRS sequence parameters,
   wherein a value of $(r_k, r_{k+1}, \delta_k)$ together indicates a number of events comprising a start of a candidate interference BW in RB k+1, an end of an candidate interference BW in RB k, and a continuing candidate interference BW in consecutive RBs (k, k+1).

9. The method of claim 4, further comprising:
   when a triple value of $(r_k, r_{k+1}, \delta_k)$ does not map to any valid interference cases, mapping the triple value of $(r_k, r_{k+1}, \delta_k)$ to one of the valid interference cases with the same $(r_k, r_{k+1})$ value either in a random manner, or a valid interference case with a closest $\delta_k$ value.

10. The method of claim 4, further comprising:
    when a triple value of $(r_k, r_{k+1}, \delta_k)$ indicates that a subset of interferers depart in RB k+1 and there are more interferers in RB k than a number of departing interferers, determining whether an interference BW continues or ends in RB k+1, either in a random manner or by creating multiple interference BW hypotheses for a next step assuming all possible interferers' departure cases.

11. An apparatus for mitigating interference in a wireless communication system, the apparatus comprising:
    a transceiver configured to receive a signal transmitted from a transmitter; and
    a processor configured to:
    subtract a target signal within a target bandwidth (BW) from the received signal to obtain a resultant signal, wherein the target signal is constructed by estimating a target channel and target symbols from the signal;
    determine a subspace blind interference sensing (BIS) BW by extending resource blocks (RBs) in a frequency domain prior to a starting RB and after an ending RB of the target bandwidth using energy detection in each RB;

determine a set of candidate interfering BWs in the subspace BIS BW by determining a number of interferers in each RB in the subspace BIS BW;

determine a set of candidate interfering DMRS sequence parameters $\{(u, n_{cs}, n, k)\}$ based on the set of candidate interfering BWs by performing DMRS detection for each candidate interfering BW, wherein u is a group number and $n_{cs}$ indicates a cyclic shift parameter and n and k are determined based on the candidate interfering BW; and perform interference cancellation based on the determined set of candidate interfering DMRS sequence parameters.

12. The apparatus of claim 11, wherein the processor is further configured to:

construct interfering signals within the subspace BIS BW based on the set of candidate interfering DMRS sequence parameters, wherein interfering signals are constructed by estimating interfering channels and interfering symbols;

subtract the constructed interfering signals from the received signal;

decode a target data signal from the resultant signal; and in response to decoding the target signal from signal being failed, set the resultant signal to be the signal after subtracting the constructed interfering signals from the received signal, and go back to extending the subspace BIS BW on the resultant signal.

13. The apparatus of claim 11, wherein the processor is further configured to:

decode the received signal after receiving the signal transmitted from a transmitter; and in response to decoding the received signal being failed, proceed to subtracting the target signal within the target BW from the received signal.

14. The apparatus of claim 11, wherein the processor is further configured to:

calculate respective triple values of $(r_k, r_{k+1}, \delta_k)$ for all pairs of consecutive RBs (k, k+1) in the subspace BIS BW, where $r_k$ and $r_{k+1}$ are determined based on eigenvalues of two separate covariance matrices for RBs k, and k+1, respectively, and $\delta_k$ is determined based on eigenvalues of a joint covariance matrix for two consecutive RBs k and k+1 together, wherein the two separate covariance matrices are obtained using the signal resulting from subtracting the target signal from the received signal.

15. The apparatus of claim 14, wherein the respective triple values of $(r_k, r_{k+1}, \delta_k)$ are determined by comparing the respective eigenvalues of the two separate covariance matrices for the two consecutive RBs to at least one threshold.

16. The apparatus of claim 15, wherein the threshold is chosen to be a value in between a lower bound and an upper bound, wherein the lower and upper bounds for different eigenvalues are either the same or different, and are determined as functions of parameters including eigenvalues.

17. The apparatus of claim 15, wherein $r_k$ and $r_{k+1}$ indicate the number of interferers in RBs k and k+1, respectively, and $\delta_k$ indicates the number of interferers in RBs k and k+1 together.

18. The apparatus of claim 14, wherein the processor is further configured to:

map a triple value of $(r_k, r_{k+1}, \delta_k)$ for consecutive RBs k and k+1 to a respective valid interference case;

aggregate the interference cases for all pairs of consecutive RBs (k, k+1) in the subspace BIS BW to obtain a set of candidate interference BWs $\{(n, k)\}$, where n and k correspond to size and offset parameters of a candidate interference BW, respectively;

obtain a set of all possible DMRS sequence parameters $\{(u, n_{cs}, n, k)\}$ for all interference BWs in the set of candidate interference BW; and perform DMRS detection over a set of all possible DMRS sequences to obtain the set of candidate interfering DMRS sequence parameters, wherein a value of $(r_k, r_{k+1}, \delta_k)$ together indicates a number of events comprising a start of a candidate interference BW in RB k+1, an end of a candidate interference BW in RB k, and a continuing candidate interference BW in consecutive RBs (k, k+1).

19. The apparatus of claim 14, wherein the processor is further configured to:

when a triple value of $(r_k, r_{k+1}, \delta_k)$ does not map to any valid interference cases, map the triple value of $(r_k, r_{k+1}, \delta_k)$ to one of the valid interference cases with the same $(r_k, r_{k+1})$ value either in a random manner, or a valid interference case with a closest $\delta_k$ value.

20. The apparatus of claim 14, wherein the processor is further configured to:

when a triple value of $(r_k, r_{k+1}, \delta_k)$ indicates that a subset of interferers depart in RB k+1 and there are more interferers in RB k than a number of departing interferers, determine whether an interference BW continues or ends in RB k+1, either in a random manner or by creating multiple interference BW hypotheses for a next step assuming all possible interferers' departure cases.

* * * * *